United States Patent
Thakare et al.

(10) Patent No.: US 9,668,139 B2
(45) Date of Patent: May 30, 2017

(54) SECURE NEGOTIATION OF AUTHENTICATION CAPABILITIES

(75) Inventors: Kiran Thakare, Stockholm (SE); Per Ernström, Stockholm (SE); Mats Näslund, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1408 days.

(21) Appl. No.: 12/463,461

(22) Filed: May 11, 2009

(65) Prior Publication Data

US 2010/0064135 A1    Mar. 11, 2010

Related U.S. Application Data

(60) Provisional application No. 61/094,715, filed on Sep. 5, 2008.

(51) Int. Cl.
*H04L 29/06* (2006.01)
*H04W 12/12* (2009.01)
*H04W 12/06* (2009.01)
*H04W 88/08* (2009.01)

(52) U.S. Cl.
CPC .......... *H04W 12/12* (2013.01); *H04W 12/06* (2013.01); *H04L 63/123* (2013.01); *H04W 88/08* (2013.01)

(58) Field of Classification Search
CPC ......... H04N 21/25816; H04N 21/4415; H04N 21/441; H04N 21/25875; H04W 12/06
USPC ....................................... 713/156
See application file for complete search history.

(56) References Cited

U.S. PATENT DOCUMENTS

| | | | |
|---|---|---|---|
| 6,711,400 B1* | 3/2004 | Aura | 455/411 |
| 7,519,036 B2* | 4/2009 | Zhang | 370/338 |
| 8,005,076 B2* | 8/2011 | Gallagher et al. | 370/353 |
| 2002/0066011 A1 | 5/2002 | Vialen et al. | |
| 2003/0200433 A1* | 10/2003 | Stirbu | 713/169 |
| 2004/0087305 A1* | 5/2004 | Jiang et al. | 455/432.1 |
| 2006/0135160 A1* | 6/2006 | Jiang | 455/435.1 |

(Continued)

FOREIGN PATENT DOCUMENTS

| | | |
|---|---|---|
| WO | 03/077581 A | 9/2003 |
| WO | 03/077581 A1 | 9/2003 |

(Continued)

OTHER PUBLICATIONS

International Search Report and Written Opinion mailed Oct. 6, 2009 in corresponding PCT Application No. PCT/SE2009/050554.

(Continued)

*Primary Examiner* — Esther B Henderson
(74) *Attorney, Agent, or Firm* — Baker Botts, LLP

(57) ABSTRACT

A network (20) comprises an authenticator node (22) and a server (24) such as an authentication, authorization, and accounting (AAA) server. A method comprises a terminal (30) sending authentication capabilities information (AC) across a network access interface (32) to the network (the authentication capabilities information provides an indication of authentication capabilities of the terminal). The network (20) then uses the authentication capabilities information to determine a first cryptographic value. The terminal (30) then uses the authentication capabilities information to determine a second cryptographic value. The network (20) compares the first cryptographic value and the second cryptographic value to authenticate the terminal.

35 Claims, 15 Drawing Sheets

(56) References Cited

U.S. PATENT DOCUMENTS

| | | | |
|---|---|---|---|
| 2006/0205388 A1* | 9/2006 | Semple et al. | 455/411 |
| 2007/0204160 A1* | 8/2007 | Chan et al. | 713/171 |
| 2008/0178004 A1* | 7/2008 | Wei | H04L 63/0869 |
| | | | 713/171 |

FOREIGN PATENT DOCUMENTS

| WO | 2004/098144 A | 11/2004 |
|---|---|---|
| WO | 2004/098144 A1 | 11/2004 |
| WO | 2008/072646 A2 | 6/2008 |

OTHER PUBLICATIONS

"Universal Mobile Telecommunications System (UMTS) 3G security; Security Architecture (3GPP TS 33.102 version 7.1.0 Release 7); ETSI TS 133 102", ETSI Standards, LIS, Sophia Antipolis Cedex, France, vol. 3 SA3, No. V7.1.0, Dec. 1, 2006.

IEEE Standard for Local and Metropolitan Area Networks; Part 16: Air Interface for Broadband Wireless Acess Systems; IEEE Computer Society and the IEEE Microwave Theory and Techniques Society; Sponsored by the LAN/MAN Standards Committee, IEEE Std 802.16™-2009, May 29, 2009.

Japanese Decision on Rejection mailed Nov. 22, 2013 in Japanese Application 2011-526008.

Office Action issued by the Canadian Intellectual Property Office for Application No. 2,736,172, Jun. 12, 2015.

* cited by examiner

SECURE NEGOTIATION OF AUTHENTICATION CAPABILITIES

This application claims the priority and benefit of U.S. Provisional patent application 61/094,715, filed Sep. 5, 2008, entitled "SECURE NEGOTIATION OF AUTHENTICATION CAPABILITIES", which is incorporated herein by reference in its entirety.

TECHNICAL FIELD

This invention pertains to telecommunications, and particularly to authentication of communications.

BACKGROUND

In a typical cellular radio system, wireless terminals (also known as mobile stations and/or user equipment units (UEs)) communicate via a radio access network (RAN) to one or more core networks. The wireless terminals can be mobile stations or user equipment units (UE) such as mobile telephones ("cellular" telephones) and laptops with wireless capability), e.g., mobile termination), and thus can be, for example, portable, pocket, hand-held, computer-included, or car-mounted mobile devices which communicate voice and/or data with radio access network.

The radio access network (RAN) covers a geographical area which is typically divided into cell areas, with each cell area being served by a base station, e.g., a radio base station (RBS), which in some networks is also called "BS" in WiMAX, "AP" in WLAN, and also known as "NodeB" or "B node" in $3^{rd}$ generation mobile networks. A cell is a geographical area where radio coverage is provided by the radio base station equipment at a base station site. Each cell and/or base station is identified by an identity within the local radio area, which is broadcast in the cell. The base stations communicate over the air interface operating on radio frequencies with the user equipment units (UE) within range of the base stations.

In some versions (particularly earlier versions) of the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks. The base stations may also have means for enabling the hand over of wireless terminals between base stations, either assisted by the core network, or using direct base station interconnections.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UTRAN is essentially a radio access network using wideband code division multiple access for user equipment units (UEs). The Third Generation Partnership Project (3GPP) has undertaken to evolve further the UTRAN and GSM based radio access network technologies.

Specifications for the Evolved Universal Terrestrial Radio Access Network (E-UTRAN) are ongoing within the $3^{rd}$ Generation Partnership Project (3GPP). The Evolved Universal Terrestrial Radio Access Network (E-UTRAN) comprises the Long Term Evolution (LTE) and is part of the System Architecture Evolution (SAE).

Long Term Evolution (LTE) is a variant of a 3GPP radio access technology wherein the radio base station nodes are connected directly to a core network rather than to radio network controller (RNC) nodes. In general, in LTE the functions of a radio network controller (RNC) node are performed by the radio base stations nodes. As such, the radio access network (RAN) of an LTE system has an essentially "flat " architecture comprising radio base station nodes without reporting to radio network controller (RNC) nodes. Thus, the evolved UTRAN (E-UTRAN) comprises evolved base station nodes, e.g., evolved NodeBs or eNBs, providing evolved UTRAN user-plane and radio resource control-plane protocol terminations toward the wireless terminal.

WiMAX, the Worldwide Interoperability for Microwave Access, is a telecommunications technology that provides for the wireless transmission of data in a variety of ways, ranging from point-to-point links to full mobile cellular-type access. The technology provides the users with an idea of enjoying the broadband speed without the actual requirement of any wires or bulky network structures. The technology is based on the IEEE 802.16 standard (also called WirelessMAN). The name "WiMAX" was created by the WiMAX Forum.

When a node such as a wireless terminal attaches to a network, there is often performed a security handshake containing authentication and configuring the use of encryption on the radio interface etc. To this end, the wireless terminal must notify the network which security capabilities (e.g. security algorithms and protocols) it supports so that the network can make a suitable choice. However, this notification can be vulnerable for so called bidding-down attacks, as described below.

Suppose, for example, that the wireless terminal supports authentication algorithm S ("secure") and authentication algorithm L ("less secure"). Suppose further that a malicious party intervenes and changes the wireless terminal's capability signaling from the set of authentication algorithms {S, L} to the set {L}, as depicted in FIG. 1. The network will believe the wireless terminal (UE) only supports authentication algorithm L ("less secure"), and therefore the network will be forced to choose the less secure L. This means that the security obtained for the wireless terminal will be less that it could have been. Even worse, if the system allows terminals without any security capabilities, the attacker could forward an empty set of authentication algorithms, e.g., { }, meaning that the wireless terminal supports no security at all. Consequently there is a need to protect the message containing the wireless terminal's security related (and possibly other) capabilities.

The usual or natural approach to security threats is to integrity protect the notification message that advises the network of the security capabilities of the wireless terminal. However, since the notification message normally must take place before the authentication, no cryptographic keys are usually available for this purpose since the keys are created after (or simultaneously with) the authentication. Using public key technology would be an option, but suffers from poor efficiency and lack of public key infrastructure (PKI) support in most wireless standards.

A solution for WiMAX is to move the capability signaling (SBC capability) until after the authentication step.

The earlier IEEE 802.16 standards used the Privacy and Key Management (PKM) protocol which had many critical drawbacks. IEEE 802.16e includes a new version of the Privacy and Key Management (PKM) protocol released as PKMv2. PKMv2 has radical changes and in contrast with the previous version, including security features like nonces, message authentication codes, key ids, certificates, etc. Thus, PKMV2 in WIMAX carries some security capability in the PKM request message. These capabilities are security related and also might be related to the authentication capabilities, and such capabilities needs to be protected as well.

Another common technique (used in e.g. 3GPP UMTS and LTE) is depicted in FIG. 2. FIG. 2 particularly shows a wireless terminal performing parts of the network attach procedure. It is assumed that basic radio connection establishment (not shown) has already occurred. The technique comprises the following steps:

Step 2-1: The wireless terminal (UE) sends its security capabilities to the network (VPLMN). Security capabilities here refer to encryption algorithm, etc. that will be used after (successful) authentication.

Step 2-2: The network (VPLMN) fetches authentication data from an authentication, authorization, and accounting (AAA) server or portion of HPLMN. In UMTS, the AAA server is known as the Home Subscriber Server (HSS).

Step 2-3: Authentication by means of a challenge-response procedure (explained in more detail below) is performed and a key, k, is produced.

Step 2-4: The VPLMN "echoes" the security capabilities received from the wireless terminal (UE) in the message of Step 2-1, but now integrity protected (authenticated) by the key k.

Step 2-5: The wireless terminal (UE), using the same key k, verifies the integrity and checks that the capabilities are the same as it sent in message 1.

The technique exemplified by FIG. 2 solves an aforementioned problem with regards to security capabilities, but still has the unpleasant property that a faked capability message is only detected after the authentication and enabling of security functions. Moreover, the security capabilities are only reliably protected if the authentication procedure is performed in a secure manner, since otherwise the key, k, may be known to other parties, enabling forgery of the message in Step 2-4.

Challenge-response protocols forming part of the procedure of FIG. 2 exist in the prior art and are used for authentication (e.g. GSM/UMTS Authentication and Key Agreement, AKA, Extensible Authentication Protocol, EAP, Digest-authentication, etc.). In such protocols the wireless terminal and the AAA server are assumed to have a pre-shared key (or password), K. Basic aspects of such challenge-response protocols are depicted by the example steps listed below.

(1) The AAA server chooses a random value, RAND.

(2) The AAA server computes an expected response, XRES=F(K, RAND), where F is an agreed cryptographic function (F could depend also on other parameters than RAND). Other parameters, e.g. keys, may also be computed based on RAND and K.

(3) The AAA server sends RAND to the wireless terminal.

(4) The wireless terminal computes a response, RES=F(K, RAND), and sends it back (to the AAA server or some authenticator node in the access network).

(5) The AAA server/authenticator checks if RES=XRES, and if so considers the wireless terminal authenticated.

In such challenge-response protocols, Step (2) by necessity has to be performed after step (1) and before step (5) but may optionally be performed after step (3) and step (4). This poses limitations on the set of possible authentication procedures.

In general, systems such as UMTS or LTE protect the security capabilities, but do not protect the authentication capabilities. It is likely that such systems in the near future may support a plurality of authentication capabilities, and hence the lack of protection of the authentication capabilities creates both a basic threat against the authentication procedures, as well as a "domino effect" since the security capabilities may become threatened as a side effect. The reason that the authentication capabilities are not protected is partly due to the inherent "chicken-and-egg" problem associated with any straight-forward approach attempting to provide such protection.

Moreover, the security related capabilities in the prior art arrangements mentioned above (e.g. UMTS) are only protected between a visited public land mobile network (VPLMN) and the wireless terminal. This is means that a strong trust in the VPLMN is needed since otherwise the VPLMN could still "fake" the wireless terminal capabilities forwarded from the wireless terminal. In particular, the authentication capabilities may sometimes be an "end-to-end" issue between wireless terminal and authentication and accounting (AAA) function/server and should likewise be end-to-end protected.

SUMMARY

In one of its aspects the technology disclosed herein concerns a method of operating a communications network which communicates with a wireless terminal over an interface. The network comprises an authenticator node and a server such as an authentication, authorization, and accounting (AAA) server. In its most basic form, the method comprises the terminal sending authentication capabilities information across the interface to the network (the authentication capabilities information provides an indication of authentication capabilities of the terminal). The network then uses the received authentication capabilities information to determine a first cryptographic value to be used within an authentication and key agreement procedure with the terminal. The terminal then uses the authentication capabilities information to determine a second cryptographic value to be used within the authentication and key agreement procedure. If the first and second cryptographic values differ, at least part of the authentication and key agreement procedure fails. The failure can be detected by the network, the terminal, or both.

In an example implementation, the authentication capabilities information comprises an identification (e.g., a list) of authentication algorithms, authentication/protocols, or authentication credentials supported by the terminal.

Obtaining verification of the authentication procedure using the first cryptographic value and the second cryptographic value can occur in various ways. For example, obtaining verification can comprise comparing the first cryptographic value and the second cryptographic value and thereby making an explicit determination of whether the authentication procedure is successful (e.g., the authentication procedure is determined to be successful if the first cryptographic value equals the second cryptographic value). In some example embodiments such comparison of the first cryptographic value and the second cryptographic value can be performed by the network; in other example embodiments such comparison of the first cryptographic value and the second cryptographic value can be performed by the terminal. In yet other example embodiments obtaining the verification essentially comprises the network attempting to use the first cryptographic value and the terminal attempting to use the second cryptographic value in conjunction with secure (e.g., encrypted) communications between the network and the terminal. Such embodiments involve determining success of the authentication procedure if the encryption/decryption operations communications do not fail. The verification is in this case an example of implicit comparison, i.e. it is not based on explicit comparison, "is x==y?", but is rather based on evaluating a criteria of form "does h(x) match with g(y)?" for some cryptographic functions h, g.

Thus, in one example embodiment the network provides the terminal with the first cryptographic value. The terminal compares the first cryptographic value and the second cryptographic value to authenticate the network and rejects the authentication and key agreement procedure if they differ.

In another example embodiment the terminal provides the network with the second cryptographic value, used as a cryptographic value. The network compares the first cryptographic value and the second cryptographic value to authenticate the terminal and rejects the authentication and key agreement procedure if they differ.

In yet another embodiment the first and second cryptographic value comprise session key material to be used in secure communication between the terminal and the network (e.g. encryption and/or data integrity protection). If either the network or the terminal detects a communication error related to the secure communication, the authentication and key agreement procedure is rejected.

In an example server-based mode of the method, the terminal sends the authentication capabilities information across the interface to an authenticator node and to the server. The server uses the authentication capabilities information to determine the first cryptographic value. The terminal uses the authentication capabilities information to determine the second cryptographic value. The authenticator node compares the first cryptographic value and the second cryptographic value to authenticate the terminal.

In a more detailed implementation of the server-based mode, the terminal sends the authentication capabilities information across the radio interface to the authenticator node. The authenticator node in turn sends the authentication capabilities information to the server. The server generates the first cryptographic value as a function of the received authentication capabilities information, a random number, and a key (the key being pre-shared by the terminal and the server). The server sends the random number and the first cryptographic value to the authenticator node. The authenticator node sends the random number to the terminal. The terminal uses the random number, the key, and the authentication capabilities information to compute the second cryptographic value. The terminal sends the second cryptographic value to the authenticator node.

In an input-modified variation of the server-based mode, the terminal sends authentication capabilities information across the interface to the authenticator node. The authenticator node sends the authentication capabilities information to the server. The server chooses a secondary random number and further uses the secondary random number and the received authentication capabilities information to determine a primary random number. The server generates the first cryptographic value as a function of the primary random number and a key which is pre-shared by the terminal and the server. The server sends the secondary random number and the first cryptographic value to the authenticator node. The authenticator node sends the secondary random number to the terminal. The terminal uses the secondary random number and the authentication capabilities information to determine a second primary random number. The terminal uses the second primary random number and the key to compute the second cryptographic value.

In the input-modified variation of the server-based mode the server uses a server first function to determine the first cryptographic value, and an input to the server first function is dependent on the authentication capabilities information.

In an example implementation, the first cryptographic value is an authentication token (AUTN). In another embodiment the first cryptographic value is a ciphering key (CK) and/or an integrity key (IK). In another embodiment the first cryptographic value is an expected response (XRES) and the second cryptographic value is a response (RES). In another example implementation, the first cryptographic value is a master session key (MSK) key of Extensible Authentication Protocol Method for UMTS Authentication and Key Agreement (EAP-AKA).

Some of the embodiments describe herein utilize an explicit check value. For example, if the first authentication capabilities are modified by an attacker, a result (RES) value derived in the terminal will differ from the corresponding expected result (XRES) value generated by the network, and the comparison of RES and XRES will fail in the network. The embodiment in which the AUTN serves as the cryptographic value is also an example of an explicit check value, although in that embodiment the failure will be detected in the terminal. In other cases, e.g. when keys (MSK and/or CK/IK) are used as check value, the check values are implicit since detection of modified security capabilities will be due to e.g. ciphering failure.

In an example shared mode of the method, the terminal sends authentication capabilities information across the interface to an authenticator node of the network. The authenticator node requests a third cryptographic value from a server of the network. The server generates the third cryptographic value as a function of a random number and a key, the key being pre-shared by the terminal and the server. The server sends the random number and the third cryptographic value to the authenticator node. The authenticator node uses the random number, the third cryptographic value, and the authentication capabilities information to determine a first cryptographic value. The authenticator node sends the random number to the terminal. The terminal uses the random number, the key, and the authentication capabilities information to determine the second cryptographic value. The terminal sends the second cryptographic value to the authenticator node. In an example implementation of the shared mode, the authenticator node is a Serving GPRS Support Node (SGSN) or MME (Mobility Management Entity) node in a visited public land mobile network (VPLMN) and the server is an AAA server or Home Subscriber Server (HSS) in a home public land mobile network (HPLMN).

In another of its aspects the technology disclosed herein concerns a node of a communications network. The node is configured to use authentication capabilities information of a terminal to determine a cryptographic value for the terminal (the authentication capabilities information provides an indication of authentication capabilities of the terminal). For example, the authentication capabilities information comprises an identification (e.g., a list) of authentication algorithms, authentication protocols, and/or authentication credentials supported by the terminal.

In an example embodiment the node comprise a server configured to determine the cryptographic value as a function of the authentication capabilities information, a random number, and a key, the key being pre-shared by the terminal and the server.

Another embodiment of the node comprises a server configured to choose a secondary random number and to use the secondary random number and the authentication capabilities information to determine a primary random number. The server is further configured to generate the cryptographic value as a function of the primary random number and a key which is pre-shared by the terminal and the server. This embodiment is an example of embodiments in which the server is configured to use a server first function to determine the cryptographic value, and wherein an input to the server first function is dependent on the authentication capabilities information.

In an example implementation, the node is an authenticator node (e.g. MME (Mobility Management Entity) node or Serving GPRS Support Node (SGSN)) in a visited public land mobile network (VPLMN). In another example implementation, the node comprises an AAA server or Home Subscriber Server (HSS) node in a home public land mobile network (HPLMN).

In another of its aspects the technology disclosed herein concerns a communications network comprising a first node and a second node. The first node is configured to receive authentication capabilities information of a terminal and to request a third cryptographic value from the second node. The second node is configured to generate the third cryptographic value as a function of a random number and a key which is pre-shared by the terminal and the second node. The first node is configured to use the random number, the third cryptographic value, and the authentication capabilities information to determine a first cryptographic value and to compare a second cryptographic value received from the terminal with the first cryptographic value to authenticate the terminal. In an example implementation, the first node comprises an Serving GPRS Support Node (SGSN) or MME (Mobility Management Entity) node in a visited public land mobile network (VPLMN) and the second node comprises a AAA server or Home Subscriber Server (HSS) node in a home public land mobile network (HPLMN).

In another of its aspects the technology disclosed herein concerns a terminal configured to send authentication capabilities information over an interface to a communications network and to also use the authentication capabilities information to determine a cryptographic value which is sent over the interface to the communications network for authentication of the terminal. In an example implementation the authentication capabilities information comprises an identification of authentication algorithms supported by the terminal.

In another of its aspects the technology disclosed herein concerns a terminal configured to send authentication capabilities information over an interface to a communications network and to also use the authentication capabilities information to determine a first cryptographic value. The terminal is further configured to compare the first cryptographic value to a second cryptographic value received from a communications network as part of an authentication procedure and to reject the authentication procedure if the comparison fails. In an example implementation the authentication capabilities information comprises an identification of authentication algorithms supported by the terminal.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware such as a computer capable of executing software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Figure 3A:
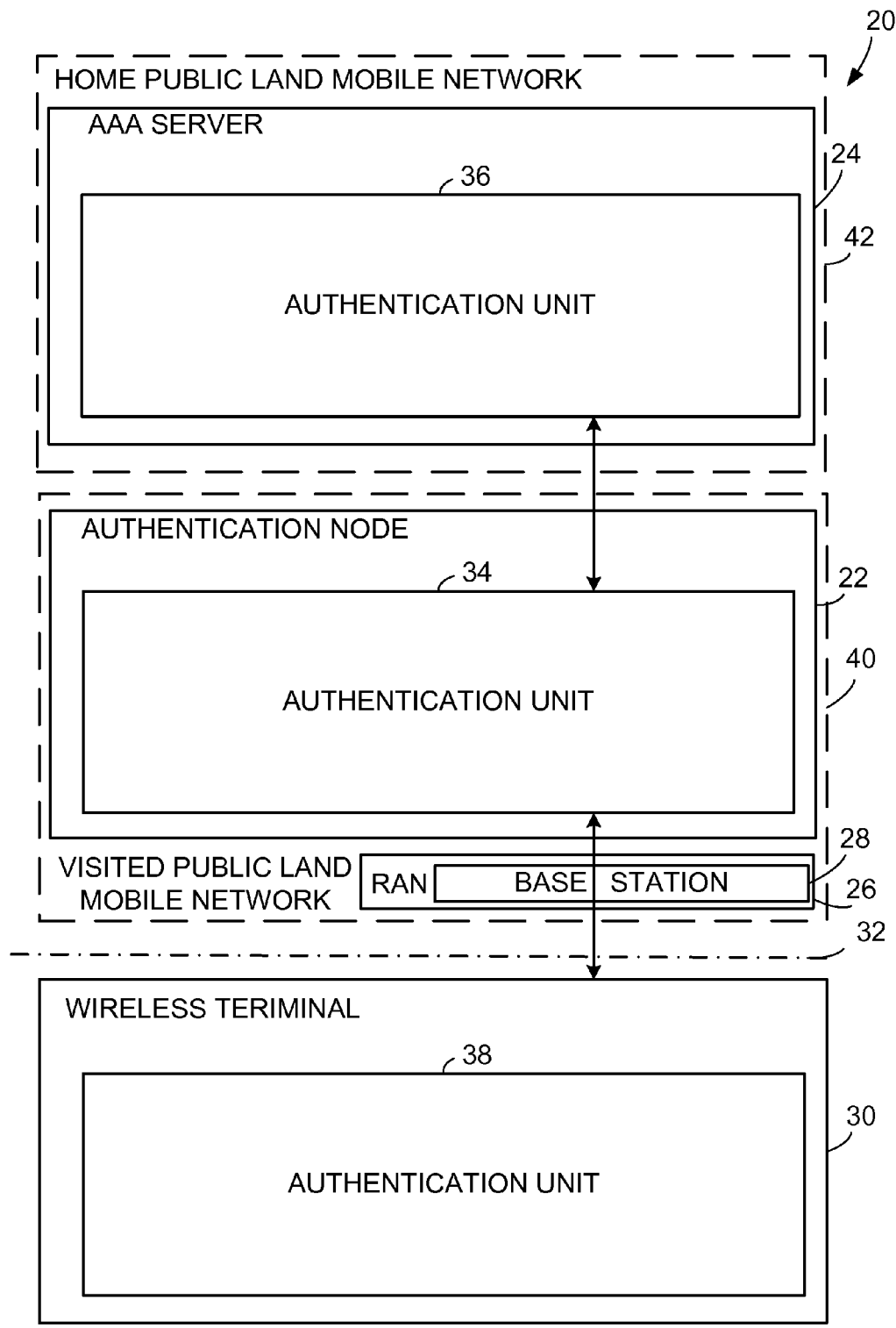
FIG. 3A is a schematic view of relevant portions of a first example communications network suitable for contextualizing the technology disclosed herein.

FIG. 3A shows relevant portions of an example communications network 20 suitable for contextualizing the technology disclosed herein. The communications network 20 comprises authentication node 22 and authentication, authorization, and accounting (AAA) server 24. The authentication node 22 is connected to access network 26. The access network 26 comprises at least one base station 28, also known as a radio base station. The base station 28 communicates with a terminal 30 over an interface 32. Thus, in the example embodiment of FIG. 3A the access network 26 is a radio access network and terminal 30 is a wireless terminal which communicates over air or radio interface 32.

Figure 3B:
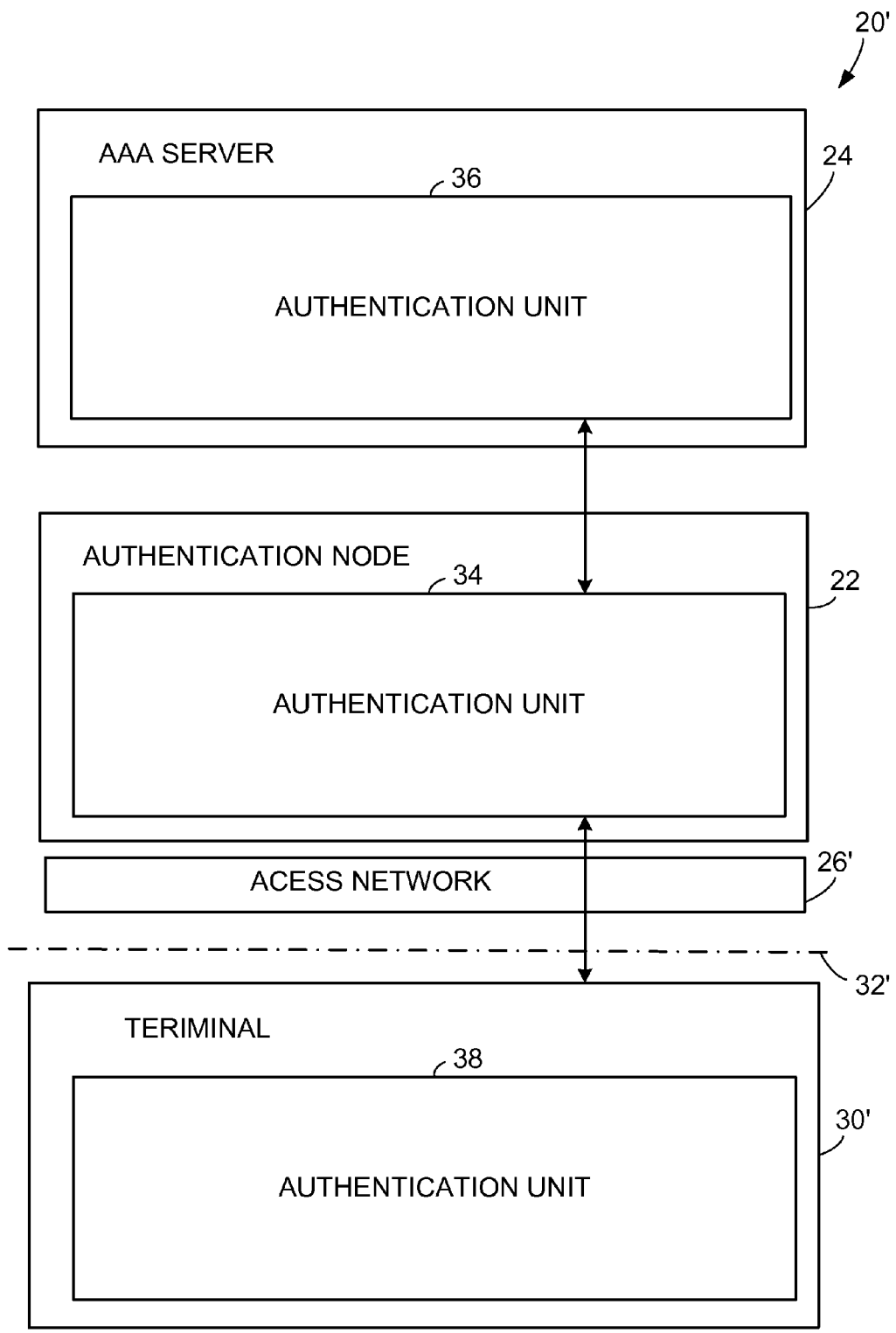
FIG. 3B is a schematic view of relevant portions of a second example communications network suitable for contextualizing the technology disclosed herein.

FIG. 3B illustrates that the technology disclosed herein is not confined to a radio access network or for use with a wireless terminal. Rather, FIG. 3B shows that the access network can be other than radio-based, e.g., and that the terminal 30' can be other than wireless (e.g., wired or cable-connected using e.g. phone line, optical fiber, coaxial cable, etc). Although ensuing embodiments are primarily described with reference to the wireless context of FIG. 3A, it should be appreciated that such embodiments also can be implementation in a more general context such as shown in FIG. 3B.

The authentication node 22 can be any suitable node of communications network 20, such as (for example) a Serving GPRS Support Node (SGSN), an MSC, or a Mobility Management Entity (MME). The AAA server 24 can also be located at a node of communications network 20, for which reason AAA server 24 can also be considered to be a node. In this regard, AAA server 24 can be located at a (Radius or Diameter) AAA Server, a home location register/authentication centre (HLR/AuC), or a Home Subscriber Server (HSS).

Figure 1:
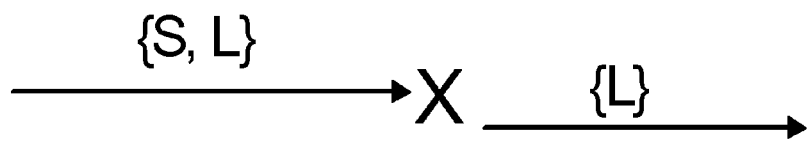
FIG. 1 is a diagrammatic illustrating potential attack by a malicious party of communications between a terminal and a network.
Figure 2:
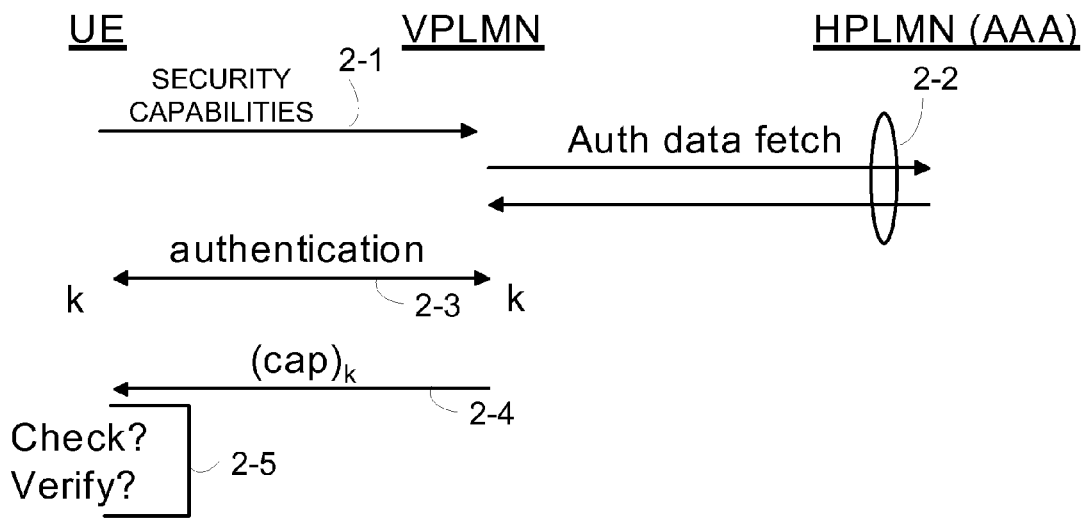
FIG. 2 is a diagrammatic view of steps involved in a common authentication technique.

In one of its basic aspects, the technology disclosed herein solves the bidding-down issue of the authentication protocol capabilities such as the problem described with reference to FIG. 1. To do so, the technology disclosed herein involves and integrates information pertaining to the authentication protocol capabilities into the authentication procedure itself. To this end authentication node 22 comprises authentication unit 34; AAA server 24 comprises authentication unit 36; and terminal 30 comprises authentication unit 38. In some embodiments described herein the dependency of an authentication procedure upon authentication capabilities information is essentially transparent to authentication node 22; in other embodiments such dependency is instead transparent to AAA server 24.

In an example implementation of the type shown in FIG. 3A, authentication node 22 is situated in or comprises a Visited Public Land Mobile Network (VPLMN) 40, which can also be comprised by the radio access network (RAN) 26. In an example implementation, AAA server 24 is situated in or comprises a Home Public Land Mobile Network (HPLMN) 42.

Figure 4:
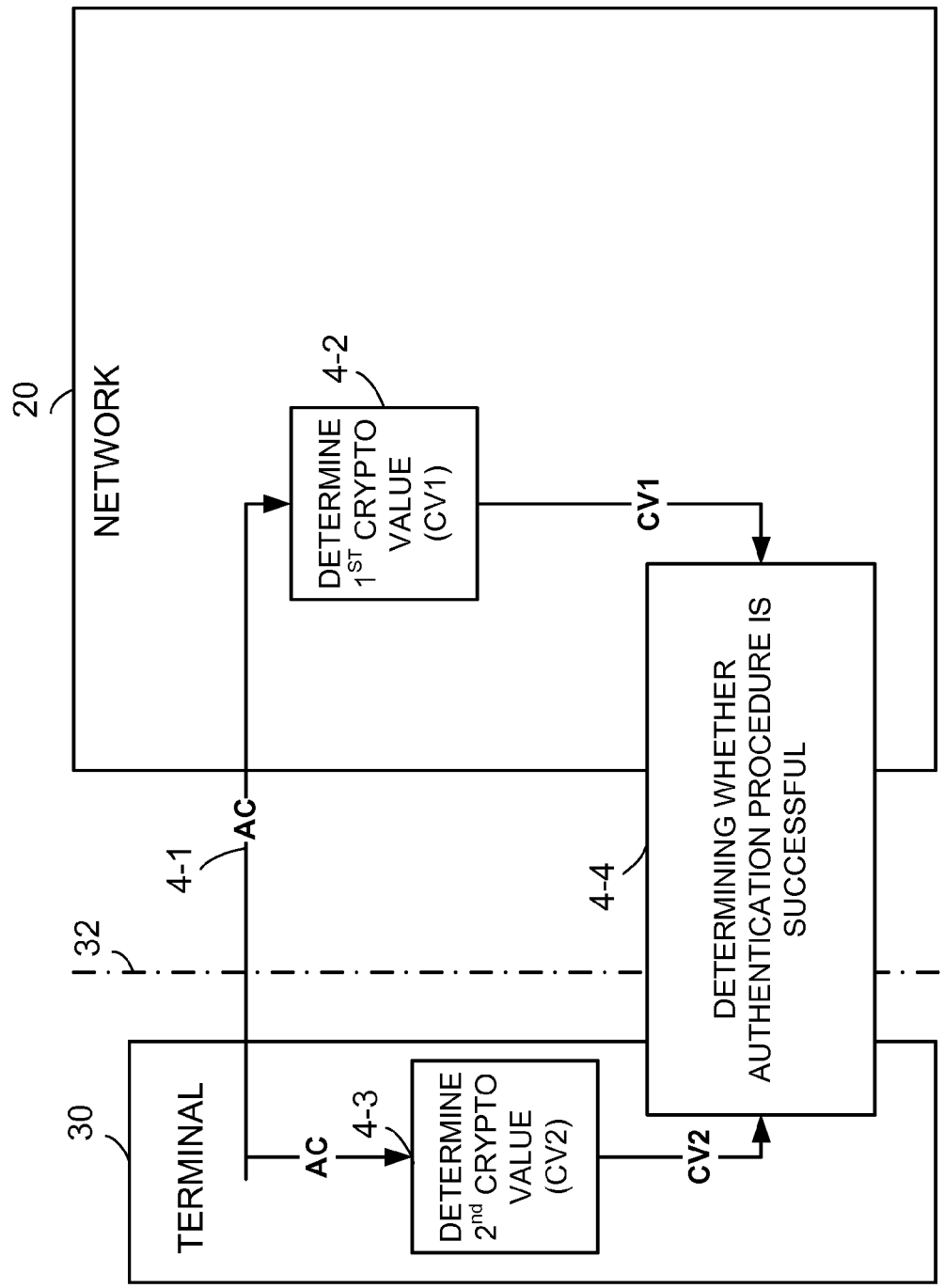
FIG. 4 is a diagrammatic view showing example acts or steps which are performed in a generic mode of a method in conjunction with communications network of FIG. 3.

FIG. 4 shows example acts or steps which are performed in a generic mode of an authentication procedure for communications network 20 of FIG. 3. Act 4-1 comprises terminal 30 sending authentication capabilities information (AC) message across interface 32 to network 20.

In the embodiments described herein, the authentication capabilities information (AC) provides an indication of authentication capabilities of the terminal. The authentication capabilities therefore differ from security capabilities, which essentially concern encryption algorithms or the like which are to be utilized upon completion of a successful authentication procedure. The authentication capabilities information (AC) can be, for example, identification (e.g., a listing or description) of authentication algorithm(s), authentication protocol(s), and/or authentication credentials for which the terminal 30 is eligible or capable. Various different types of authentication algorithms might be included in the authentication capabilities information (AC) message sent as Act 4-1, depending on the type and nature of the terminal. A non-exhaustive sampling of example authentication algorithms for a terminal which are of a type which might be included in an example authentication capabilities information (AC) message include Milenage, RSA®, etc. Examples of authentication protocols may be UMTS AKA, EAP AKA, EAP TLS, etc. Examples of credentials may comprise IMSI(s), public key certificates etc.

It should be understood that a complete specification of an authentication mechanism may require specification of each of the authentication algorithm, the authentication protocol in which to use the algorithm, and the credentials (e.g. key and/or identifier) relative to which the authentication is performed. In some cases one or more of these three parameters are implicit and does not need to be explicitly included in the capabilities. For instance, in an LTE network only the UMTS AKA protocol is supported and there is no need to explicitly signal this fact. However, any parameter which requires explicit signaling may be subject to a bidding down attack and may therefore benefit from the protection offered by the technology described herein.

Act 4-2 comprises communications network 20 using the authentication capabilities information to determine a first cryptographic value (CV1). As act 4-3 terminal 30 uses its authentication capabilities information to determine a second cryptographic value (CV2). The first cryptographic value (CV1) and the second cryptographic value (CV2) can also be considered a first authentication check value and a second authentication check value, respectively. Act 4-4 comprises obtaining verification (using the first cryptographic value (CV1) and the second cryptographic value (CV2)) whether the authentication procedure is successful (e.g., permits authenticated communication between network 20 and terminal 30).

FIG. 4 depicts a generic mode of operation in the sense that act 4-2 can be distributed/shared between authentication node 22 and AAA server 24 in various manners in accordance with other modes of the method, including but not limited to other modes described herein. FIG. 4 is also generic from the perspective that act 4-4 can be performed by either terminal 30, network 20, or a combination of network 20 functioning together with terminal 30. For example, and as described in more detail subsequently, act 4-4 can comprise comparing first cryptographic value (CV1) and second cryptographic value (CV2) and thereby making an explicit determination of whether the authentication procedure is successful (e.g., the authentication procedure is determined to be successful if first cryptographic value (CV1) equals second cryptographic value (CV2)). In some example embodiments such comparison of first cryptographic value (CV1) and second cryptographic value (CV2) can be performed by network 20; in other example embodiments such comparison of first cryptographic value (CV1) and second cryptographic value (CV2) can be performed by terminal 30. In yet other example embodiments act 4-4 essentially comprises obtaining verification by the network 20 attempting to use the first cryptographic value (CV1) and the terminal 30 attempting to use the second cryptographic value (CV2) in conjunction with cryptographic communications (taking place after the authentication) between network 20 and terminal 30, and determining success of the authentication procedure if the secure communication (e.g. encryption/decryption) operations communications do not fail (since the communications would fail when unequal values of the first cryptographic value (CV1) and second cryptographic value (CV2) cause communication problems).

Figure 5A:
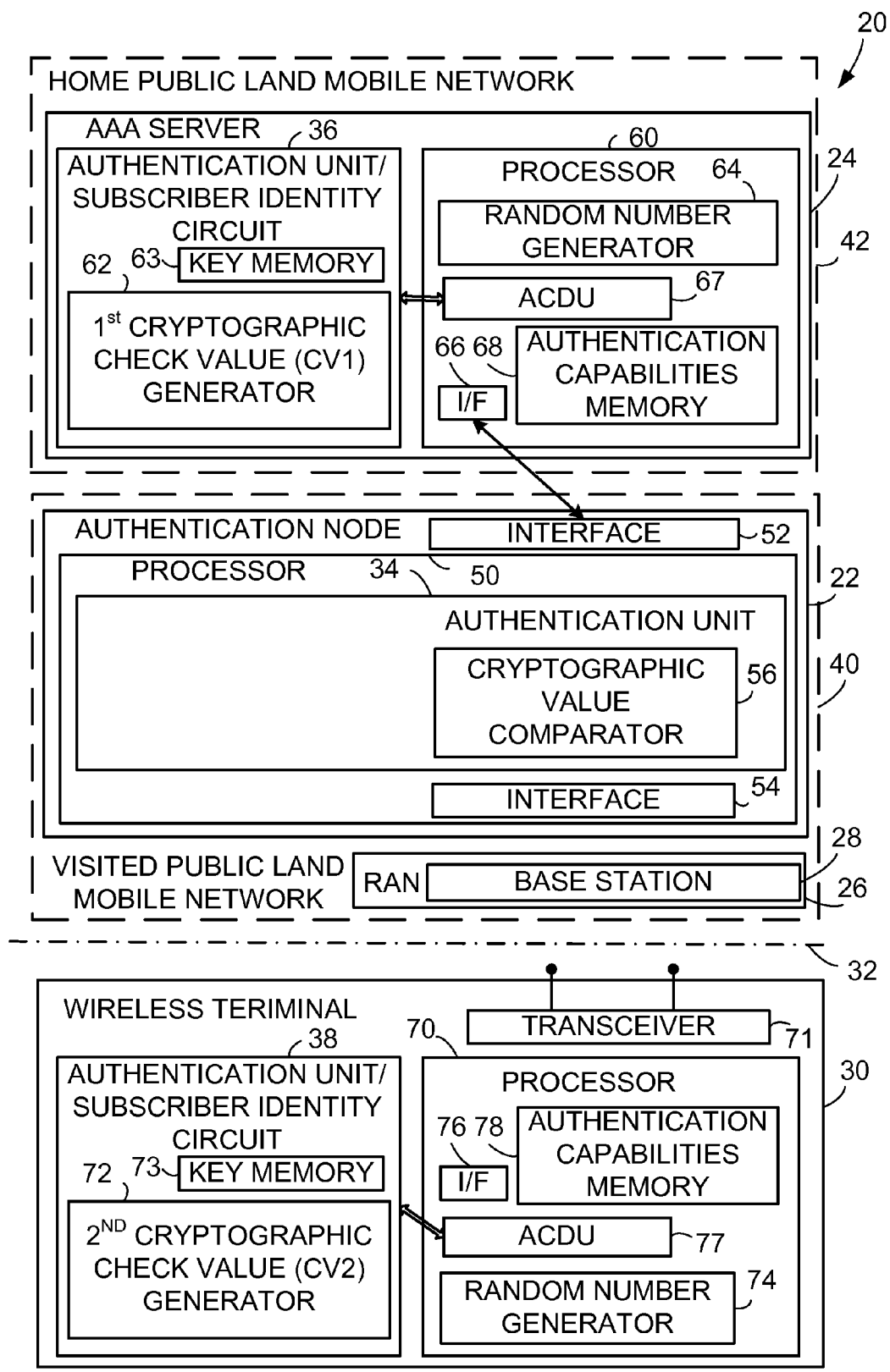
FIG. 5A-FIG. 5E show example constituent units and functionalities of an authentication node, an AAA server, and a terminal according to differing, non-limiting and more detailed example embodiments.

FIG. 5A shows, in more detail, example constituent units and functionalities of authentication node 22, AAA server 24, and terminal 30 according to a non-limiting example embodiment. As shown in FIG. 5A, authentication node 22 comprises, among other unillustrated constituent components and functionalities, authentication node processor 50; interface 52 to AAA server 24; and interface 54 to radio access network (RAN) 26 (through which communications are provided to terminal 30). In the illustrated embodiment, the authentication node processor 50 performs at least partially the role of authentication unit 34 and as such further includes cryptographic value comparator 56.

The AAA server 24 comprises the AAA server authentication unit 36 and a computer or processor depicted as AAA server processor 60. The AAA server authentication unit 36, also known as the subscriber identify circuit, further includes first cryptographic value generator 62 and key memory 63. The AAA server authentication unit 36 is typically a secure tamper resistant unit. The AAA server processor 60 comprises random number generator 64; authentication node interface 66; authentication capabilities dependency unit (ACDU) 67; and authentication capabilities memory 68. The AAA server authentication unit 36 can take the form of a circuit such as an integrated circuit or processor which is separate from processor 60. As such, in an example embodiment, the AAA server authentication unit 36 can include not only a memory (e.g., non-volatile memory), but a processor which performs computer-readable or machine-readable instructions. Thus, in view, e.g., of its processor, the AAA server authentication unit 36 is also referred to as a computer-implemented or circuit-implemented authentication unit. Similarly, being realized or embodied by AAA server processor 60, the authentication capabilities dependency unit (ACDU) 67 is also referred to as computer-implemented authentication capabilities dependency unit.

Thus, the dependency on the authentication capabilities are made through authentication capabilities dependency unit (ACDU) 67 which generally operates on input to, or outputs from, the AAA server authentication unit 36, by including dependency on authentication capabilities. In the current example embodiment, the ACDU 67 operates on inputs to the AAA server authentication unit 36. The ACDU 67 forms inputs by combing random numbers provided by the random number generator 64 and the authentication capabilities memory 68. Since the ACDU operates directly on inputs/outputs of the AAA server authentication unit 36, the ACDU may alternatively be integrated entirely or in part in the AAA server authentication unit 36 (in which case it can still be referenced as a computer-implemented or even a circuit-implemented authentication capabilities dependency unit). However, it is usually preferred to avoid modifications of the AAA server authentication unit 36 which is the reason for the functional split as indicated in at least some of the figures such as FIG. 5A.

In embodiments where the ACDU 67 operates only on the inputs to the AAA server authentication unit 36, a first cryptographic value (CV1) may be identified directly with the output of the AAA server authentication unit 36. In embodiments (described later) where the ACDU 67 operates at least partly on the outputs to the AAA server authentication unit 36, the first cryptographic value (CV1) is instead identified with the output of the ACDU 67.

The terminal 30 of FIG. 5A comprises, among other unillustrated components and functionalities, authentication unit 38; terminal computer or terminal processor 70; and transceiver 71. The transceiver 71 is used for both uplink and downlink communications with base station 28 over interface 32 in conventionally known manner. The terminal authentication unit 38 further includes second cryptographic value generator 72 and key memory 73. The terminal authentication unit 38 is typically also a secure unit. The terminal processor 70 comprises random number generator 74; authentication node interface 76; terminal authentication capabilities dependency unit (ACDU) 77; and, authentication capabilities memory 78. Like the AAA authentication unit 36, the terminal authentication unit 38 can take the form of a circuit such as an integrated circuit, and particularly can take the form of an integrated circuit card such as a Subscriber Identity Module (SIM or USIM) type card. As such, in an example embodiment, the authentication unit 38 can include not only a memory (e.g., non-volatile memory), but a processor which performs computer-readable or machine-readable instructions. Thus, in view, e.g., of its processor, the terminal authentication unit 38 is also referred to as a computer-implemented or circuit-implemented terminal authentication unit. Similarly, being realized or embodied by terminal processor 70, the authentication capabilities dependency unit (ACDU) 67 is also referred to as computer-implemented authentication capabilities dependency unit.

The terminal authentication capabilities dependency unit (ACDU) 77 of terminal 30 essentially "mirrors" the corresponding ACDU 67 in the AAA server by operating on input and/or outputs from, the terminal authentication unit 38. The ACDU 77 may alternatively be integrated entirely or in part in the terminal authentication unit 38, which case it is still a computer-implemented or even circuit-implemented authentication capabilities dependency unit. However, the same desire to leave the terminal authentication unit 38 intact typically applies also here.

Similar to the server side, in embodiments where the ACDU 77 operates only on the inputs to the terminal authentication unit 36, a second cryptographic value (CV2)

may be identified directly with the output of the terminal authentication unit 38. In embodiments (also described later) where the ACDU 67 operates at least partly on the outputs to the terminal authentication unit 38, the second cryptographic value (CV2) is instead identified with the output of the ACDU 77.

In the embodiments described herein, a key or password for terminal 30 is pre-stored, configured, or downloaded in/to both key memory 63 of AAA server authentication unit 36 and key memory 73 of the terminal authentication unit 38. The terminal 30 knows its own authentication capabilities (e.g., the authentication algorithms with/by which terminal 30 can operate), and has the authentication capabilities information (AC) indicative of such stored in authentication capabilities memory 78. If the authentication capabilities of terminal 30 change from time to time, the authentication capabilities information (AC) is accordingly updated in authentication capabilities memory 78.

Figure 6:
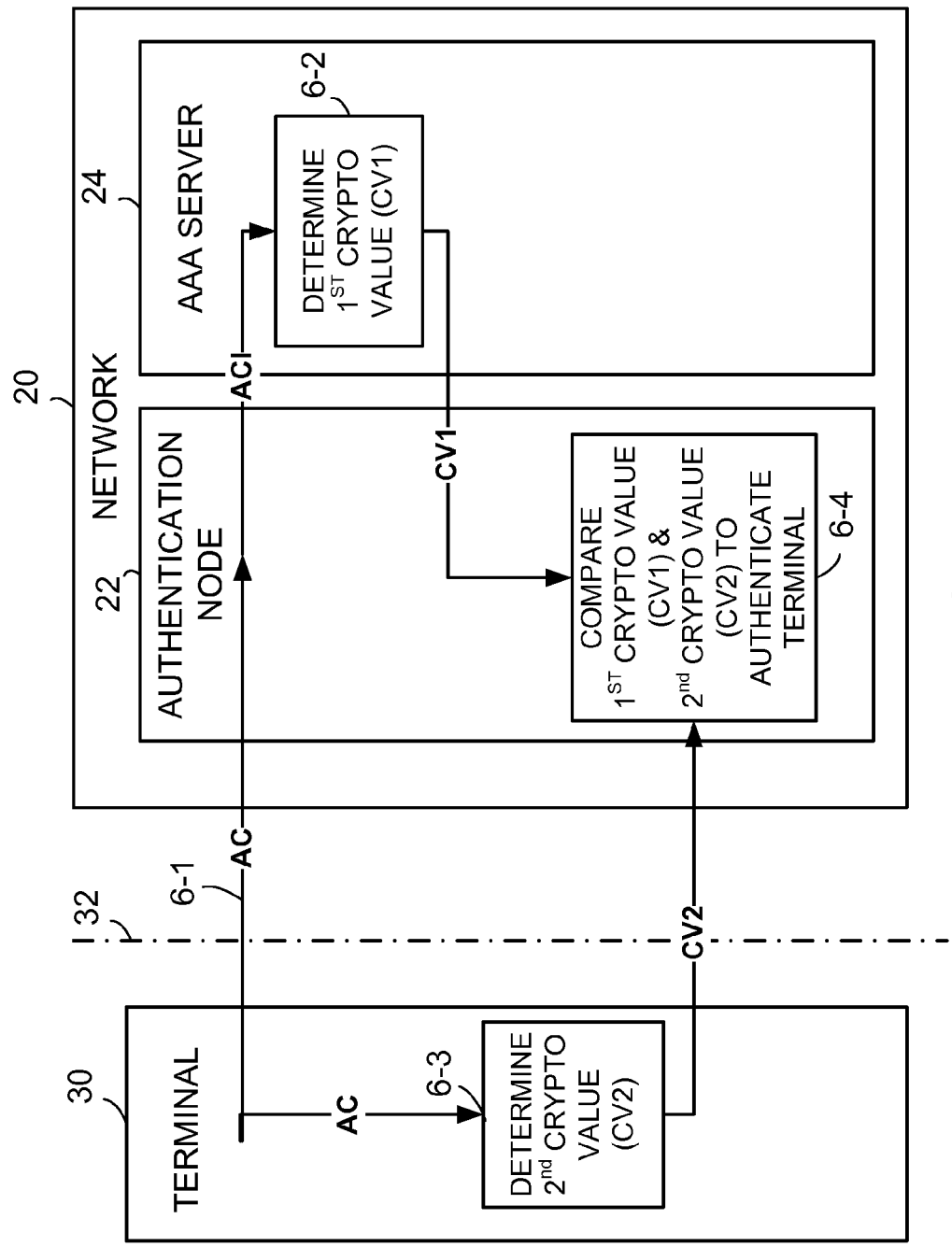
FIG. 6 illustrates example or representative, basic acts or steps of an example embodiment of a server-based method of authentication.

FIG. 6 illustrates example or representative, basic acts or steps of an example server-based mode of the method of authentication according to the technology disclosed herein. In FIG. 6, as act 6-1 terminal 30 sends the authentication capabilities information (AC) across interface 32 in an authentication capabilities information message to authentication node 22 and to AAA server 24. As shown in FIG. 6, the authentication capabilities information (AC) is typically first sent to authentication node 22, which relays the authentication capabilities information (AC) to authenticator node 22. Act 6-2 comprises AAA server 24 using the authentication capabilities information to determine the first cryptographic value (CV1). Act 6-3 comprises terminal 30 using the authentication capabilities information to determine the second cryptographic value (CV2). Act 6-4 comprises authenticator node 22 comparing the first cryptographic value (CV1) and the second cryptographic value (CV2) to explicitly determine if the authentication procedure is successful and (if successful) to thereby authenticate the terminal.

Figure 7:
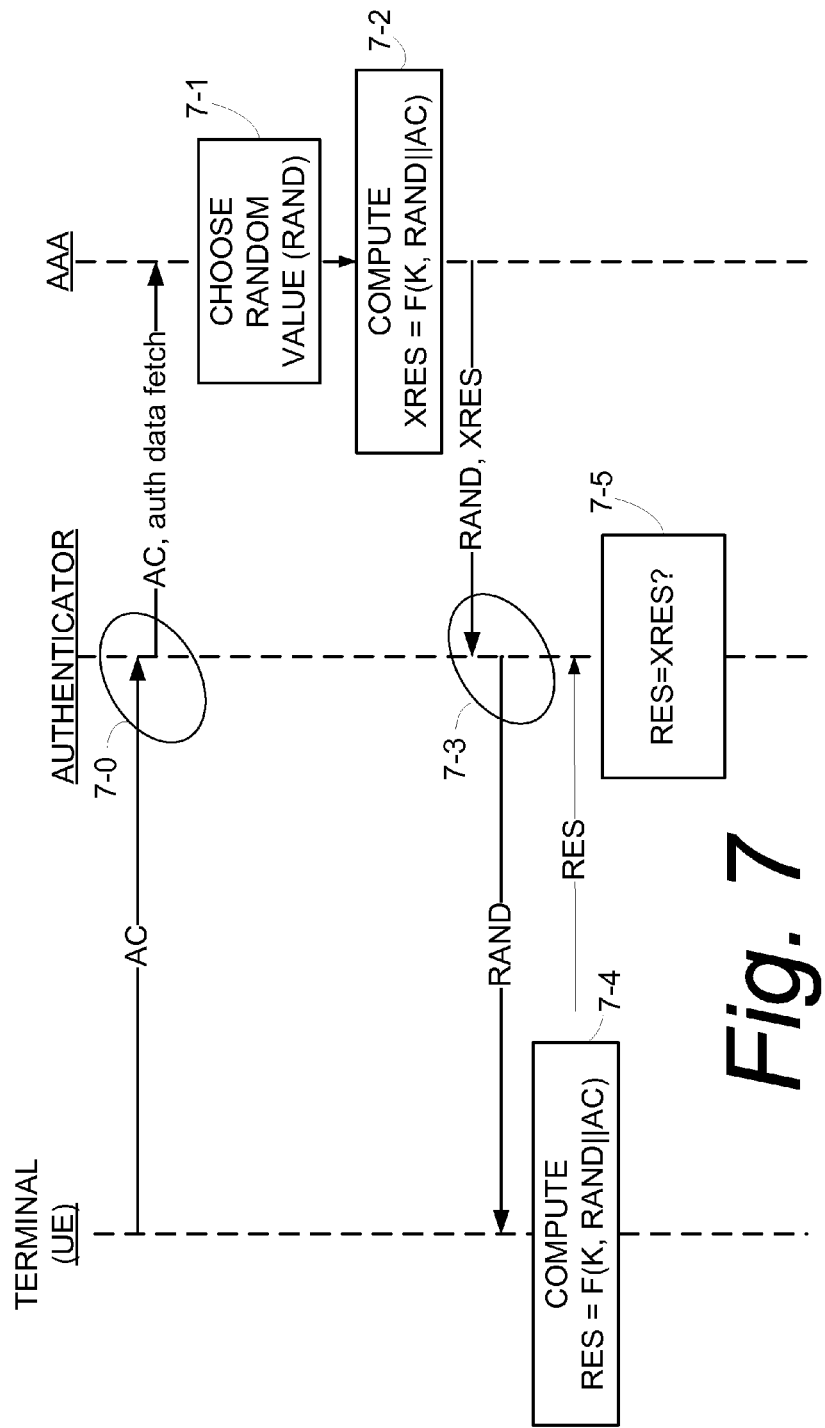
FIG. 7 shows basic or representative example acts or steps performed in a more detailed implementation of the server-based mode of FIG. 6.

FIG. 7 shows basic or representative example acts or steps performed in a more detailed implementation of the server-based mode. Act 7-0 comprises the terminal 30 sending its authentication capabilities in the form of an authentication capabilities information message to AAA server 24. As shown in FIG. 7, terminal 30 sends its authentication capabilities information across interface 32 to authentication node 22, and authentication node 22 sends the authentication capabilities information to AAA server 24.

The authentication capabilities information (AC) of terminal 30 is received through authentication node interface 66 of AAA server 24 and applied to AAA server authentication unit 36. Act 7-1 of FIG. 7 comprises AAA server processor 60 choosing a random value (RAND). In this regard, as act 7-1 processor 60 invokes random number generator 64. Having obtained the random number RAND from random number generator 64, the random number RAND is provided together with the authentication capabilities AC to the ACDU 67. The ACDU 67 combines them into RAND∥AC and this value is provided as input to the AAA server authentication unit 36. As act 7-2, the first cryptographic check value generator 62 computes a cryptographic function F producing a first result or first check value, e.g., XRES, to be used as the first cryptographic value. In particular, in the example embodiment of FIG. 7 the first cryptographic value (CV1) is computed as XRES=F(K, RAND∥AC), where F is an agreed cryptographic function and AC is the authentication capabilities information. It should be understood that the cryptographic function F could also depend on parameters other than RAND and K. Thus, as act 7-2 the cryptographic value XRES is computed as being dependent upon the authentication capabilities (AC). If desired, other parameters, e.g. keys, may also be computed as part of act 7-2.

Act 7-3 comprises AAA server 24 sending its chosen random value (RAND) to the terminal 30. More specifically, as shown in FIG. 7, AAA server 24 sends the random number RAND and the first cryptographic value XRES to authentication node 22, and the authentication node 22 in turn sends the random number RAND to terminal 30.

Act 7-4 comprises the second cryptographic check value generator 72 of terminal 30 computing a second cryptographic value, e.g., RES (e.g., the "result"). In the example embodiment of FIG. 7, the second cryptographic is computed by second cryptographic check value generator 72 as RES=F(K, RAND∥AC). In other words, terminal 30 uses the random number (RAND) received in act 7-3 from AAA server 24, the authentication capabilities information (AC) stored in authentication capabilities memory 78 to compute, via the ACDU 77, an input RAND∥AC, provided to the terminal authentication unit 38. The terminal authentication unit 38 applies the cryptographic function F and the key (K) as stored in key memory 73 to the provided input and computes the second cryptographic value RES. FIG. 7 further shows terminal 30 sending the second cryptographic value RES to authentication node 22. Thus, act 7-4 comprises the terminal 30 including in its calculation of RES the authentication capabilities information (AC) value that it (believes it) sent in the message of act 7-0.

Act 7-5 comprises authentication node 22 determining whether the authentication procedure is successful by explicitly checking whether RES=XRES and, if so, considering the terminal to be properly authenticated. In other words, the cryptographic value comparator 56 of authentication node 22 compares the first cryptographic value XRES with the second cryptographic value RES, and if RES=XRES, the authentication node 22 authenticates the terminal 30. If the first authentication capabilities provided from the terminal in step 7-0 were modified by an attacker, this comparison would fail (since RES and XRES have been computed from different inputs) and would be detected by the authentication node 22. After the determination of successful authentication of act 7-5, authentication node 22 typically sends a notification in the form of a success/failure message to the terminal, which serves to inform the terminal of the fact of successful authentication. Hence, in this case any attack will first be detected by the authentication node 22 and the detection is explicit.

The function F may thus be considered part of the terminal's authentication capabilities (e.g. different terminals could support different F functions). Typically, F is provided by a smart-card implementing a subscriber identity module function (SIM or UMTS SIM) which also provides secure storage of key(s). However the technology described herein will protect also against an attacker modifying that aspect of the security capabilities since a modification of that capability will still at least imply that different authentication capabilities (AC) inputs are used by the network and terminal, respectively. A modification of this capability may also mean that network and terminal will use different F-functions but this will typically only make it even more likely that RES and XRES are different.

In the illustrated mode of FIG. 7 it should be understood that the network may comprise more than one node performing different functionalities such as, e.g., authentication and radio reception and transmission. Even the calculation of the function F may be distributed over more than one node though the key (denoted K above) typically never leaves the (secure) key memory 63 in the AAA server. Moreover, the function of the AAA server 24 and authentication node 22, and the functionality of the user equipment unit or terminal 30 that perform acts herein described, may be realized by a processor or controller as those terms are expansively described herein, and thus can be considered as computer implemented. Such processor/controller can perform the acts described herein by executing instructions stored on any suitable computer-readable medium.

If someone has tampered with (or faked) the authentication capabilities (AC), by sending AC' instead, this means that AAA server 24 will (in act 7-2) compute a XRES which differs (since it is based on AC') from the one computed by the terminal (based on the local AC value). This, in turn, means that the terminal will be rejected, e.g., not be authenticated as noted above.

This still leaves open the issue that a malicious party might modify the authentication capabilities (AC) only to perform a Denial-of-Service DoS attack against the terminal (denying access). However, this property is shared with the 3GPP current approach described above. It is for instance always possible for an attacker to modify the RES value provided by the terminal, causing authentication to fail. It is also shared with the "basic" challenge-response authentication paradigm since the RES could be modified en-route by a third party. In any case an attacker is prevented from "fooling" the network and terminal to use a sub-optimal security level.

Figure 8:
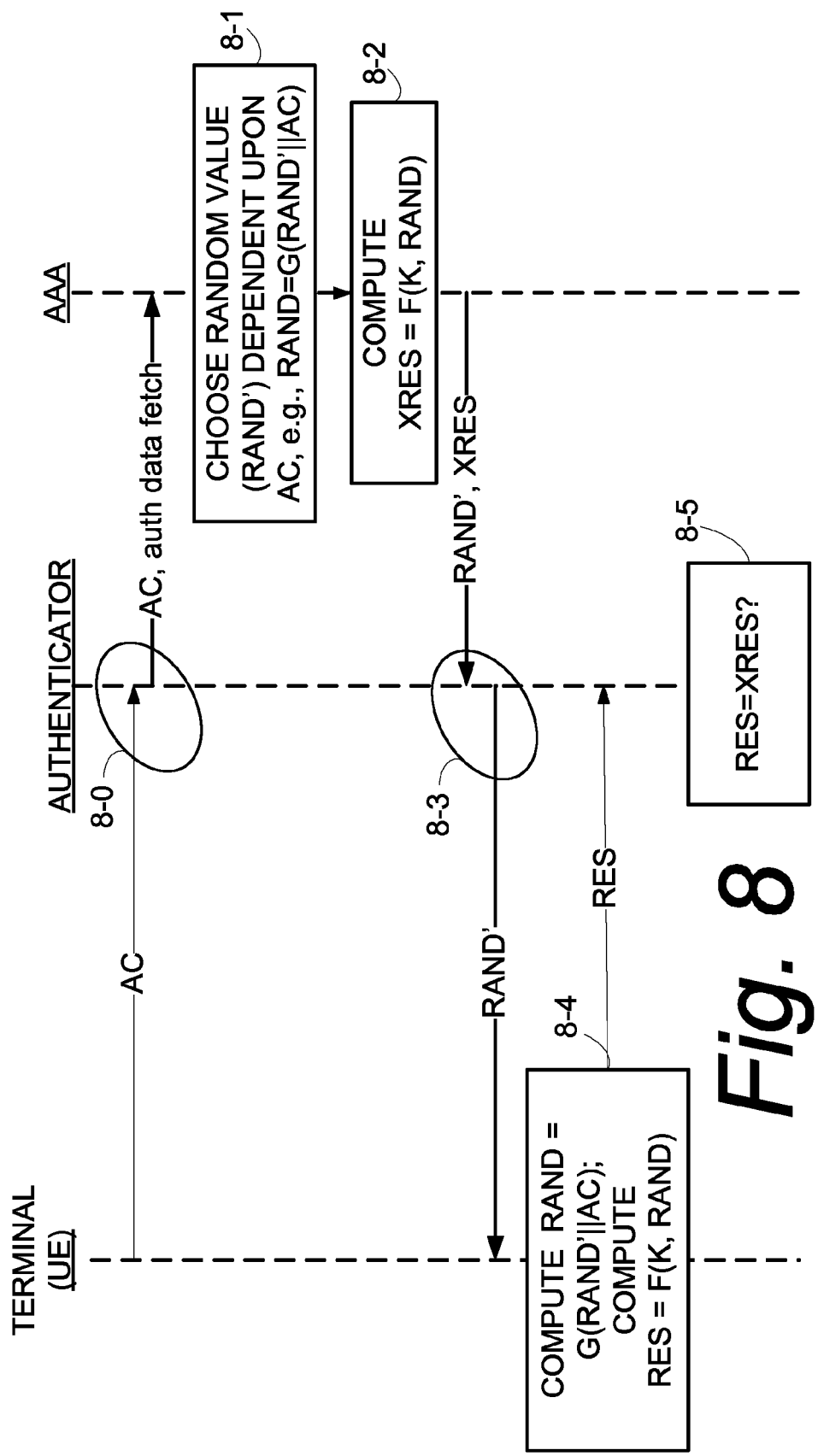
FIG. 8 is a diagrammatic view showing basic or representative example acts or steps performed by another example method of the technology disclosed herein.

In its other aspects the technology disclosed herein encompasses various variations of the foregoing. For example, FIG. 8 illustrates one example embodiment in which acts 8-x essentially correspond to similarly numbered acts 7-x of FIG. 7. In the embodiment of FIG. 8, as a more indirect way of making RES dependent on AC, the RAND is made dependent on authentication capabilities (AC) (as reflected by act 8-1 of FIG. 8). In this regard, AAA server 24 can choose a random RAND' and set RAND=G(RAND'||AC). As act 8-3 RAND' is then sent to the terminal rather than RAND, and the terminal locally computes RAND. Note that this is equivalent to modifying the cryptographic function F into the cryptographic function F'(K, RAND'||AC)=F(K, G(RAND'||AC)), and thus this is covered by the earlier-described embodiment since it has the same effect: a modified authentication capabilities (AC) value causing the comparison of RES and XRES to fail. Yet the embodiment of FIG. 8 does provide a particularly simple way to reuse already defined and/or implemented cryptographic functions. This is relevant since as mentioned the F-function is typically "hard coded" (e.g., in a smart card such as a SIM card of terminal 30) and this embodiment leaves not only the implementation of function F unaffected, but also its complete input/output behavior.

The mode of FIG. 7 and FIG. 8 are also known herein as variations of an input-modified server-based mode. Both the variations of FIG. 7 and of FIG. 8 modify the inputs to the F function, but in different ways.) Describing now the example acts of FIG. 8 in further detail, act 8-0 comprises terminal 30 sending authentication capabilities information (AC) across interface 32 to authentication node 22. The authentication node 22 in turn sends the authentication capabilities information to AAA server 24. Act 8-1 comprises AAA server 24 choosing a secondary random number (RAND') from its random number generator 64 and using the secondary random number (RAND') as well as the authentication capabilities information (AC) obtained by act 8-0 to determine, by the ACDU 67, a primary random number (RAND). Although the primary random number (RAND) is to be used for the determination of the first cryptographic value XRES, the secondary random number (RAND') will be sent to terminal 30. Act 8-2 comprises AAA server 24 generating the first cryptographic value XRES as a function of the primary random number (RAND) and the key (K) [obtained from key memory 63 and having been pre-shared by terminal 30 and AAA server 24]. Act 8-3 comprises AAA server 24 sending the secondary random number (RAND') and the first cryptographic value (XRES) to authentication node 22. The authentication node 22 in turn sends the secondary random number (RAND') to terminal 30. Act 8-4 comprises terminal 30 using the secondary random number (RAND') and the authentication capabilities information (AC) stored in authentication capabilities memory 78 to first determine the primary random number (RAND) by means of the ACDU 77, and then using the primary random number (RAND) and the key (K) to compute the second cryptographic value RES. The terminal 30 sends the second cryptographic value RES to authentication node 22, whose cryptographic value comparator 56 compares the values of the first cryptographic value XRES and the second cryptographic value RES to determine if the terminal 30 can be authenticated.

Figure 5B:
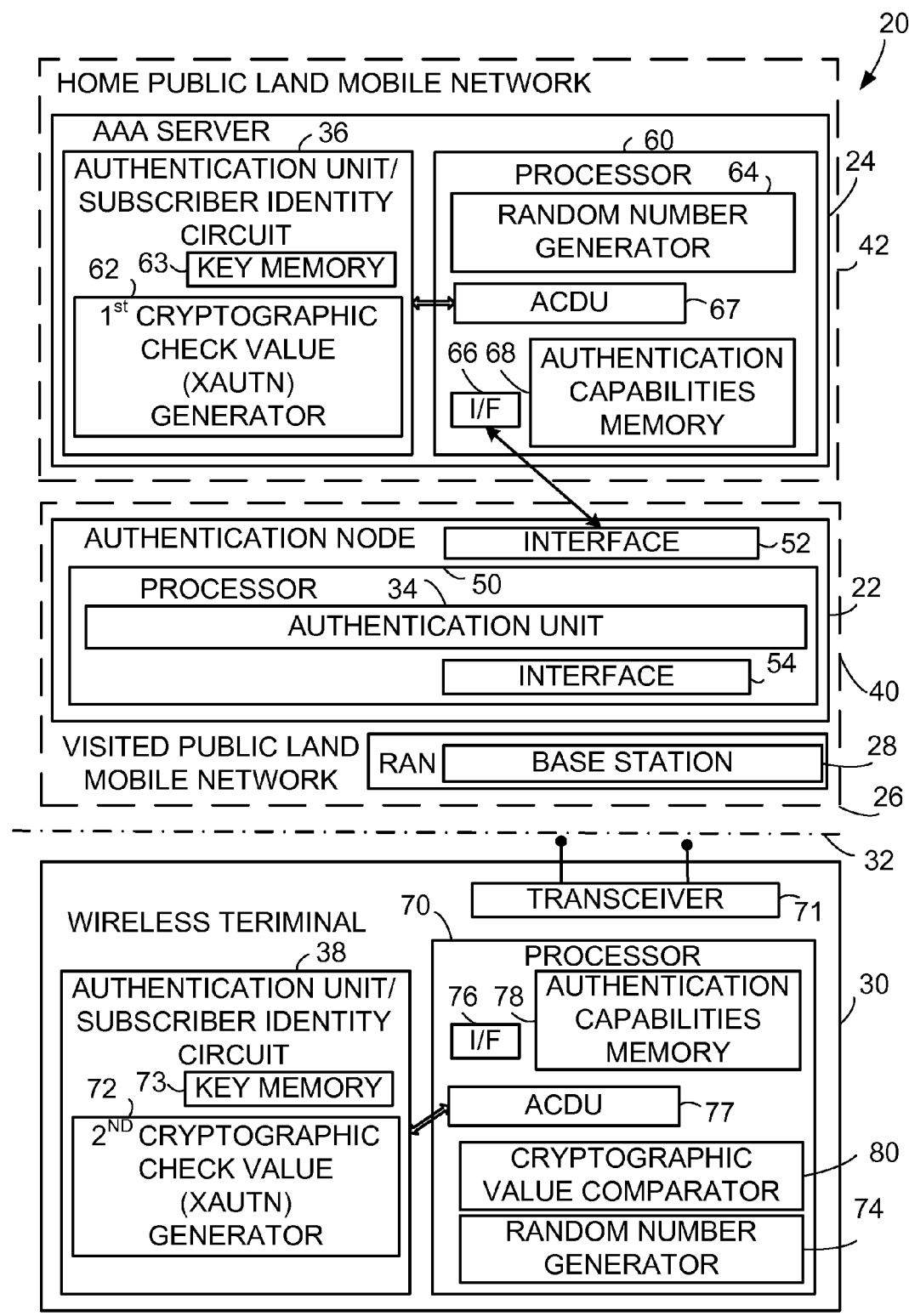
Figure 9:
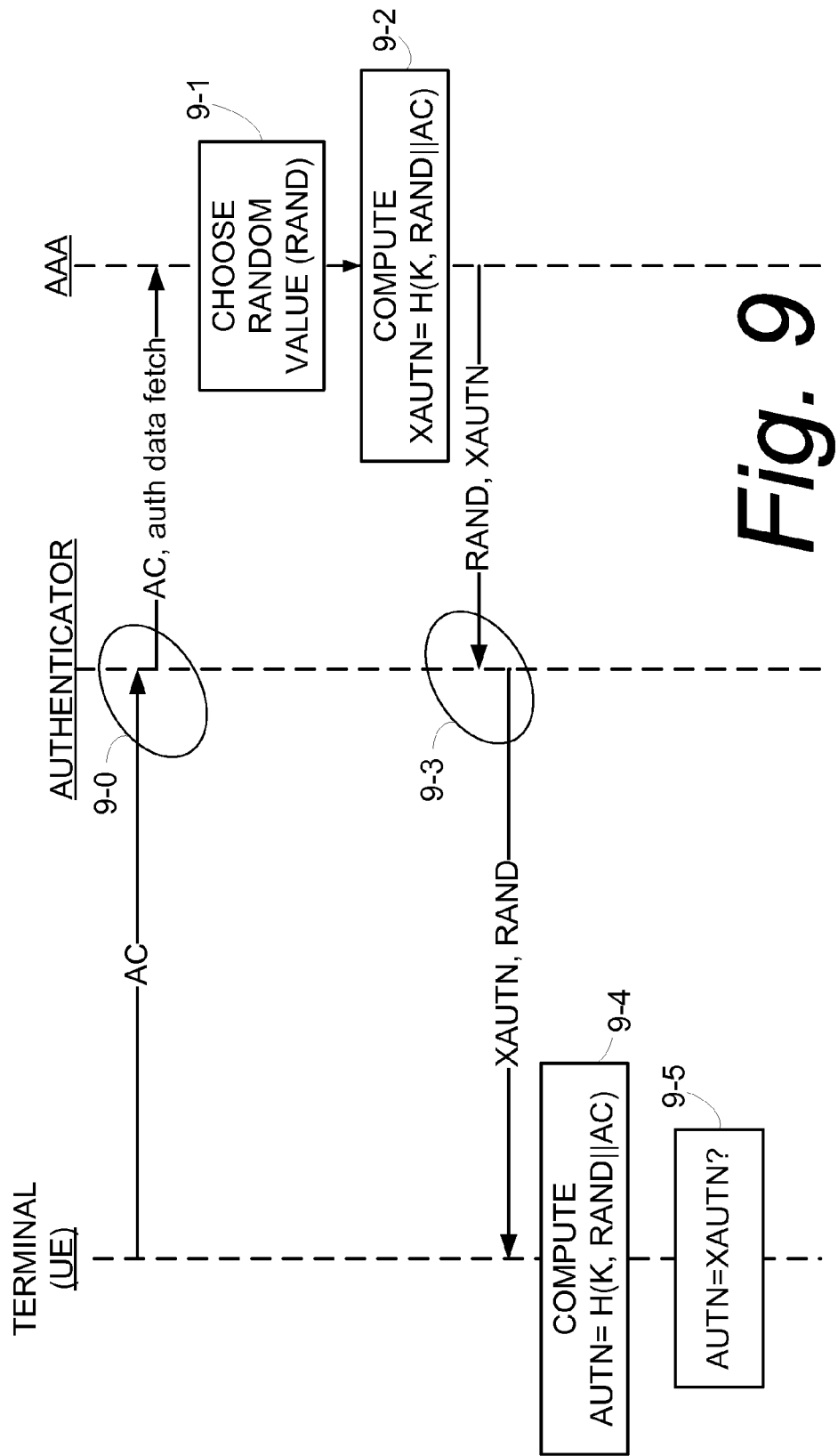
FIG. 9 is a diagrammatic view showing basic or representative example acts or steps performed in a mode involving UMTS Authentication and Key Agreement (AKA) wherein an AUTN parameter is made dependent on authentication capabilities.

FIG. 5B together with FIG. 9 illustrate another example embodiment and concerns a specific case of UMTS Authentication and Key Agreement (AKA). In the FIG. 9 embodiment, the so-called AUTN parameter (authentication token for network authentication) is made dependent on authentication capabilities (AC), and the terminal 30 makes an explicit determination of whether the authentication process is successful. In particular, for the embodiment of FIG. 5B authentication node 22 does not include a cryptographic value comparator, but rather the function of cryptographic value comparison is located in terminal 30. FIG. 5B shows the terminal authentication unit 38 of terminal 30 as comprising second cryptographic check value generator 72 and key memory 73. The processor 70 of terminal 30 comprises random number generator 74; authentication node interface 76; terminal authentication capabilities dependency unit (ACDU) 77; authentication capabilities memory 78; and cryptographic value comparator 80. As mentioned above, all or some of the functionalities of terminal authentication unit 38 can be realized or facilitated by a Subscriber Identity Module (SIM) card.

In the example embodiment shown in FIG. 5B and FIG. 9, the Authentication Token (AUTN) is sent in the Authentication Request message to the terminal along with a random number. In addition, in this and various other embodiments described herein the key sequence indicator (KSI) can also be sent to the terminal. The value of the key is not sent, only the name of the key, i.e., the KSI. The variables within the AUTN are used by the mobile in the authentication process that it conducts with the network. In particular, at AAA server 24 determines the first cryptographic value (CV1) as XAUTN=H(K,RAND||AC), and terminal 30 determines the second cryptographic value (CV2) as AUTN=H(K,RAND||AC). Similarly suffixed acts of FIG. 9 are analogous to those of FIG. 7, with the exception of using XAUTN instead of XRES as the first cryptographic value (CV1) and AUTN instead of RES as the second cryptographic value (CV2). Act 9-5 comprises cryptographic value comparator 80 of the terminal comparing XAUTN and AUTN. This mode is particularly beneficial since AUTN will be checked by the terminal before it even replies with RES, thus providing "early abort" in case of a tampered authentication capabilities information AC. This embodiment thus also provides an explicit check of the authentication capabilities, although in this case the check is performed by the terminal instead of the network. In practice, comparison of AUTN and XAUTN may be based on only part of the (X)AUTN value, i.e. the so called MAC-part thereof as specified in 3GPP TS 33.102 incorporated herein by reference and which also describes in detail how the comparison is done in this case.

Figure 5C:
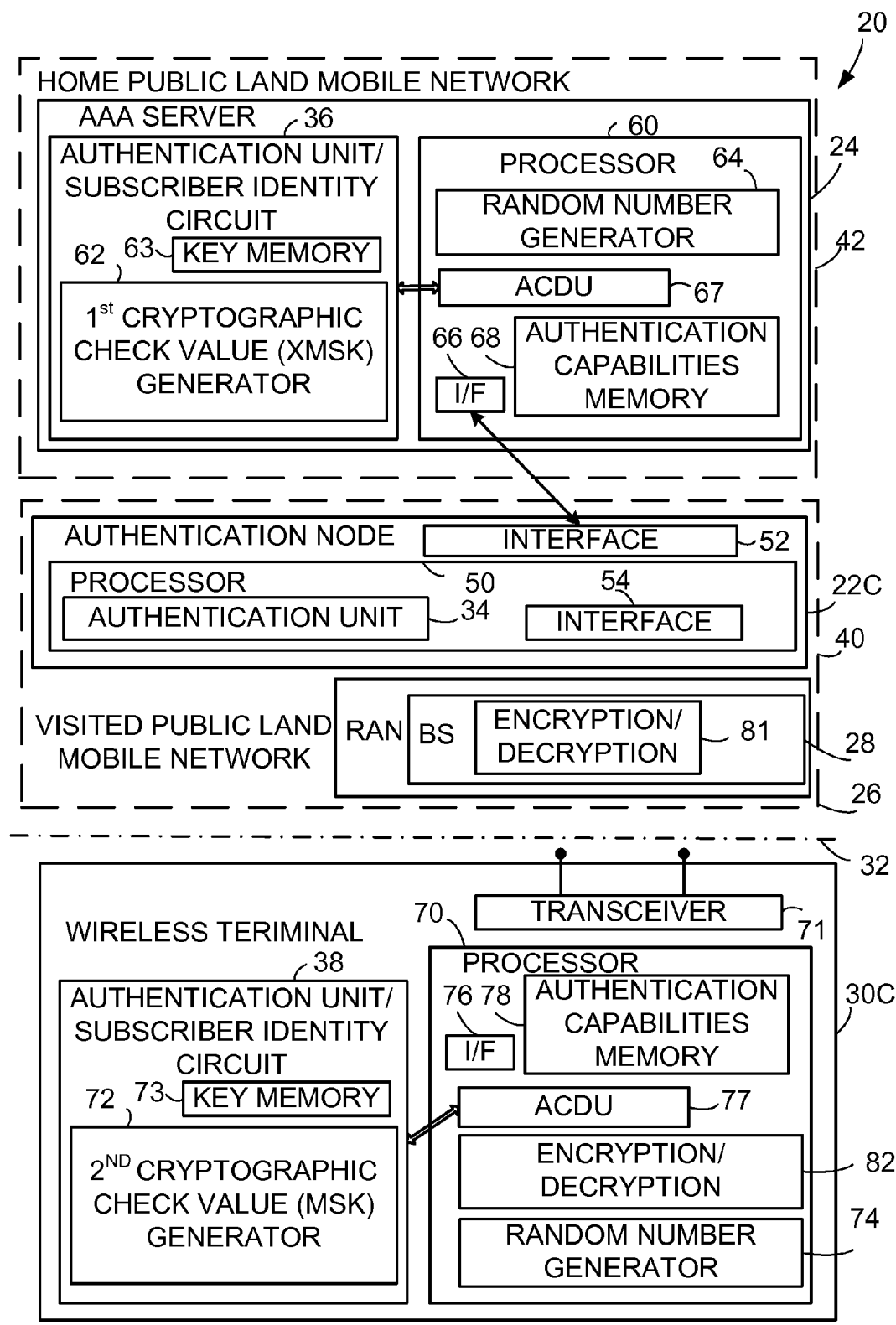
Figure 10:
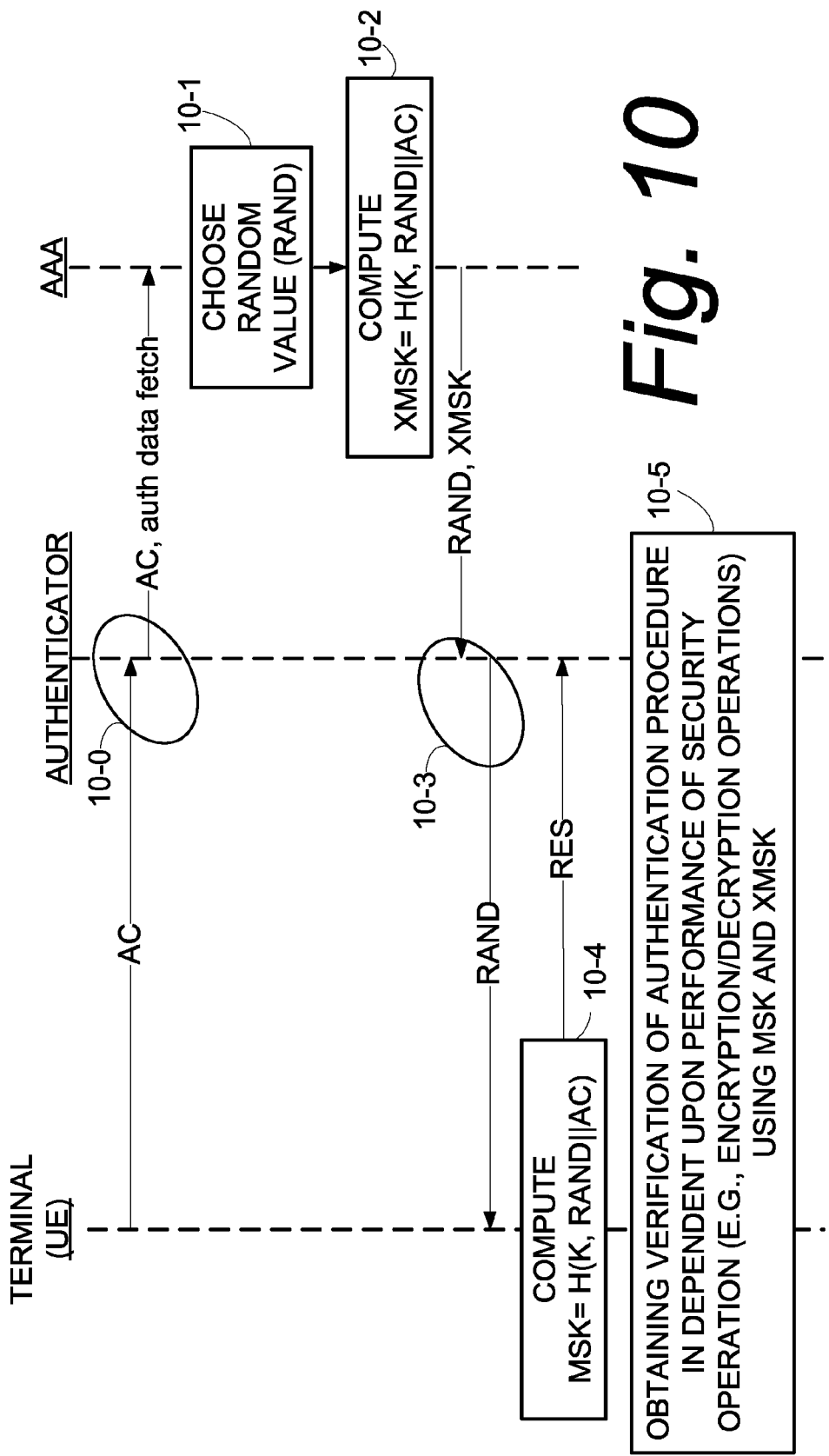
FIG. 10 is a diagrammatic view showing basic or representative example acts or steps performed in a mode involving the Extensible Authentication Protocol method wherein a Master Session Key (MSK) is made dependent on authentication capabilities.

Another example embodiment is illustrated in FIG. 5C and FIG. 10 and concerns use of the Extensible Authentication Protocol method for UMTS Authentication and Key Agreement (EAP-AKA). Extensible Authentication Protocol Method for UMTS Authentication and Key Agreement, or EAP-AKA, is an Extensible Authentication Protocol (EAP) method for authentication and session key distribution using the Universal Mobile Telecommunications System (UMTS) Subscriber Identity Module (USIM). EAP-AKA is described in RFC4187, which is incorporated herein by reference. Master Session Key (MSK) is a term used in several security techniques and procedures which describes a master key, from which a number of other keys such as authentication and encryption keys are derived.

As shown in FIG. 5C, in the EAP-AKA example embodiment neither the authentication node nor terminal 30C have a cryptographic value comparator. Rather, FIG. 5C shows that the network comprises encryption/decryption unit 81 and terminal 30C comprises an encryption/decryption unit 82. Typically the encryption/decryption unit 81 is situated at base station 28. Both encryption/decryption unit 81 and encryption/decryption unit 82 use the Master Session Key (MSK), or a key derived therefrom, in conjunction with the encryption/decryption of messages sent between terminal 30C and authentication node 22C. The encryption/decryption unit 81 typically is situated in and/or comprises base station 28. Although the other embodiments also may similarly comprise encryption/decryption units, in various other embodiments the encryption/decryption units do not necessarily play a role in validating the authentication procedure. Yet in the embodiment of FIG. 5C and FIG. 10 whether the network and terminal 30C prepare the same authentication capabilities-dependent Master Session Keys (XMSK and MSK) determines whether the encryption/decryption fails or succeeds, and thus is an indicator of whether the authentication procedure is successful (e.g., is validated).

The MSK is used as key material in, e.g., a WiMAX setting. An analogous embodiment can easily be implemented in a UMTS or LTE setting by instead adding dependency on the authentication capabilities to the native UMTS AKA keys (Ck, Ik) (from which the MSK is derived, when EAP AKA is used).

In the FIG. 10 example, the Master Session Key (MSK) is made dependent on authentication capabilities (AC). As indicated above, in this embodiment, there will typically not be an explicit verification of the authentication capabilities. Rather, if an attacker modifies the authentication capabilities (AC) of the terminal, the terminal and the network will end up using different values for the MSK. However, verification of this fact is implicit. For instance, when the terminal encrypts a message based on MSK, the decryption process in the network will decrypt using the wrong MSK value. Similarly, if data integrity protection based on MSK is used, also this will produce an error. This will make the communication between the terminal and network "fail". Thus, verification (e.g., determining whether the authentication procedure is successful) is implicit and not performed explicitly by any particular node in this embodiment. In other words, act 10-5 in FIG. 10 comprises obtaining verification of the authentication procedure in dependence upon subsequent performance of the encryption/decryption/data integrity procedure using the cryptographic values MSK and XMSK determined during the authentication procedure. The effect could be compared to making the terminal and network using incompatible "languages" when attempting to communicate.

FIG. 8, which shows the input-modified variation of the server-based mode of FIG. 7, is but one example of several embodiments in which AAA server 24 uses a server first function to determine the first cryptographic value (CV1, e.g., XRES'), and wherein an input to the server first function is dependent on the authentication capabilities information (AC). Common to some of the variations/embodiments encompassed hereby is the fact that the dependency of the capabilities (authentication capabilities (AC)) can affect the inputs to the various functions (e.g., functions F, G, and H) rather than affecting the outputs of the functions. For example, instead of computing XRES in a manner in which the dependency on the authentication capabilities (AC) is reflected by an input, e.g., XRES=F(K, RAND∥AC), XRES=F'(F(K, RAND)∥AC) could be computed for some suitable function, F', so that output of function F is affected by the authentication capabilities (AC). This is equivalent to modifying the cryptographic function F into the cryptographic function F''(K, RAND∥AC)=F'(F(K, RAND)∥AC) in the basic form described above, but this further form allows for F and F' to be computed in different nodes, where only the node calculating F' needs to know AC, and only the node calculating F needs to know the shared key.

Figure 5D:
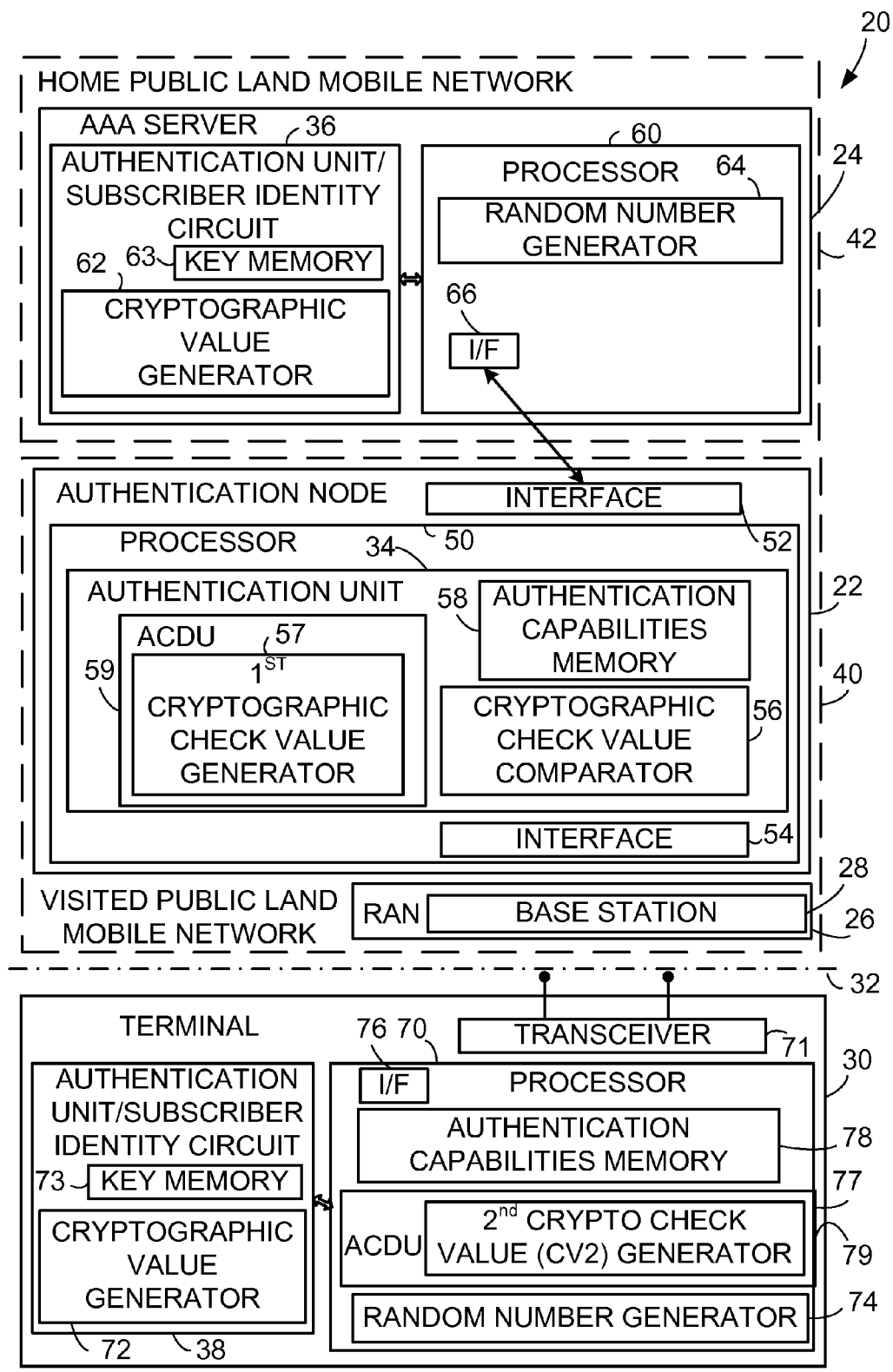

Since the function F is only possible to compute by the AAA server 24, the technique described above of having authentication capabilities information (AC) affect the output of such a function F has particular advantage in a situation such as that shown in FIG. 5D in which terminal 30 is roaming, i.e. when it operates in a Visited Public Land Mobile Network (VPLMN) 40 but has a shared secret key (K) with the Home Public Land Mobile Network (HPLMN) 42 of the terminal 30. In the situation of FIG. 5D, computation of the function F' may be "delegated" to the VPLMN (e.g., to authentication node 22 of Visited Public Land Mobile Network (VPLMN) 40) if the AAA server 24 so desires (e.g. if AAA server 24 has a reasonably strong trust in the VPLMN). To facilitate utilization of the function F' by authentication node 22, the authentication node authentication unit 34 comprises authentication node authentication capabilities dependency unit (ACDU) 57 and authentication capabilities memory 58. The authentication capabilities dependency unit (ACDU) 57 in turn comprises first cryptographic check value generator 59. Since they can be realized by or comprise processor 50, the authentication node authentication capabilities dependency unit (ACDU) 57 and its first cryptographic check value generator 59 are also referred to as a computer-implemented devices, e.g., computer-implemented authentication node authentication capabilities dependency unit. The terminal authentication capabilities dependency unit (ACDU) 77 comprises second cryptographic check value (CV2) generator 79. Since they can be realized by or comprise processor 70, the terminal authentication capabilities dependency unit (ACDU) 77 and its second cryptographic check value generator 89 are also referred to as a computer-implemented devices, e.g., computer-implemented terminal authentication capabilities dependency unit.

Figure 11:
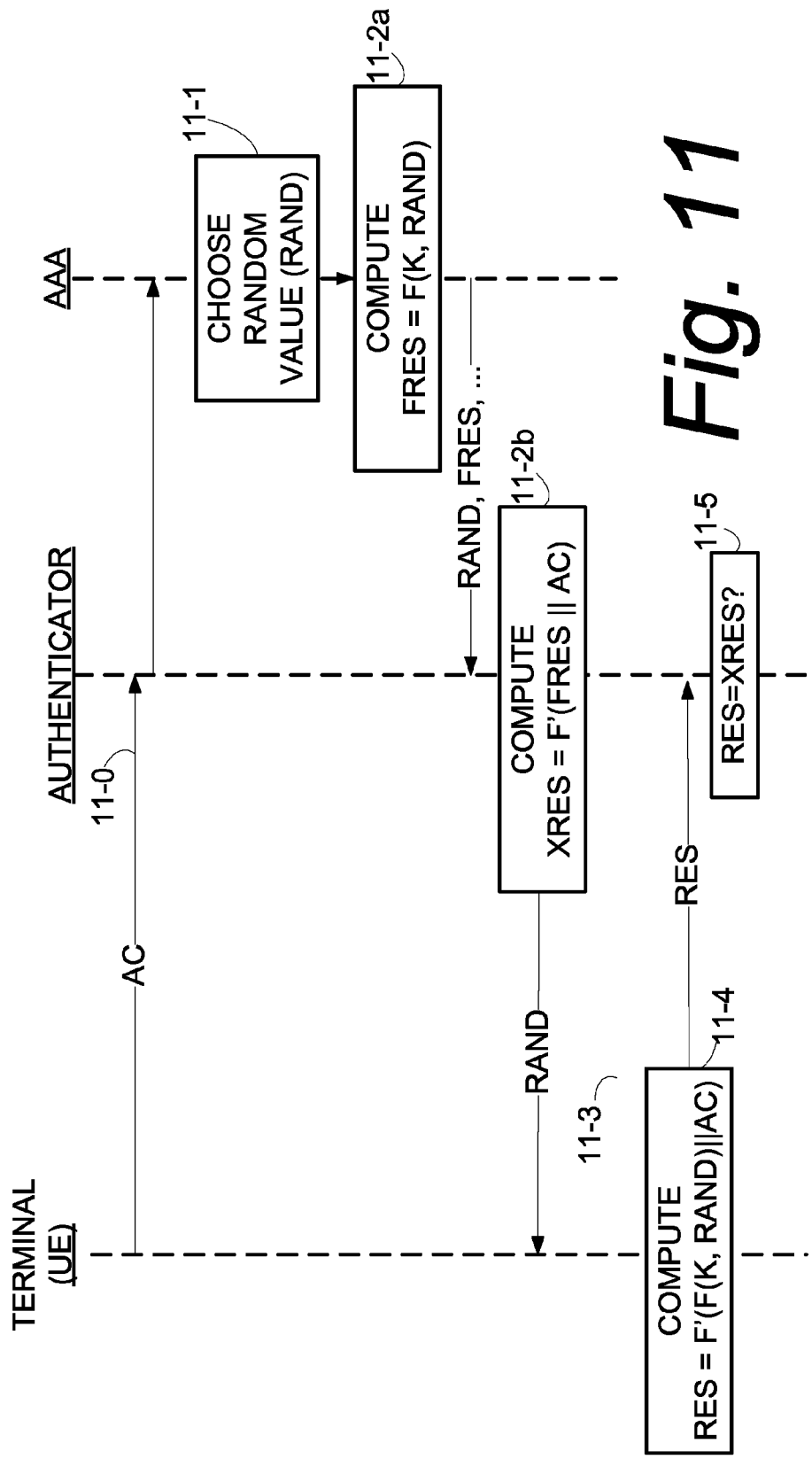
FIG. 11 is a diagrammatic view showing basic or representative example acts or steps performed by another example method of the technology disclosed herein.

An example such situation is shown in FIG. 11, which illustrates example acts or steps involved in an example shared mode of the method. Act 11-0 comprises terminal 30 sending authentication capabilities information (AC) across the interface to authentication node 22, and authentication node 22 requesting what will be termed herein as a third cryptographic value (FRES) from AAA server 24. Act 11-1 comprises AAA server 24 choosing or obtaining a random value (RAND) preparatory to computing the third cryptographic value (FRES). Act 11-2a comprises AAA server 24 generating the third cryptographic value (FRES) as a function of a random number (RAND) and a key (K), the key being pre-shared by terminal 30 and AAA server 24. The AAA server 24 then sends the random number (RAND) and the third cryptographic value (FRES) to AAA server 24. Act 11-2b comprises the authenticator node 22, and particularly the first cryptographic check value generator 59 of authentication node authentication capabilities dependency unit (ACDU) 57, using the random number (RAND), the third cryptographic value (FRES), and the authentication capabilities information (AC) to determine a first cryptographic check value (XRES) e.g., RES =F'(FRES ||AC). As part of act 11-2b, the authentication capabilities information (AC) is fetched from authentication capabilities memory 58. Act 11-3 comprises authentication node 22 sending the random number (RAND) to terminal 30. Act 11-4 comprises terminal 30 using the random number RAND), the key (K), and the authentication capabilities information (CA) to determine the second cryptographic value (RES). The terminal 30 then sends the second cryptographic value (RES) to AAA server 24. Act 11-5 comprises the authentication node 22 comparing the first cryptographic value (XRES) and the second cryptographic value (RES) as a prerequisite for authenticating the terminal 30.

The example embodiment of FIG. 11 is thus in contrast to the basic form of the technology disclosed herein and represented by FIG. 5A (for example) and wherein the HPLMN (AAA server 24) needs to know both the key (K) and authentication capabilities information (AC). In the embodiment of FIG. 11 the authentication node 22 needs to know the authentication capabilities information (AC) but AAA server 24 need not know the authentication capabilities information (AC). Conversely, the authentication node 22 does not need know the key K but the AAA server 24 needs to know the key K. The same or similar sharing/distribution/delegation of actions as performed in the FIG. 11 embodiment can also be performed in other embodiments regardless of manner of verification of success of the authentication procedure, e.g., in embodiments in which there is an explicit verification by either the terminal or the authentication node and in embodiments in which there is implicit verification by utilization of the first cryptographic values in a subsequent encryption/decryption operation.

Figure 5E:
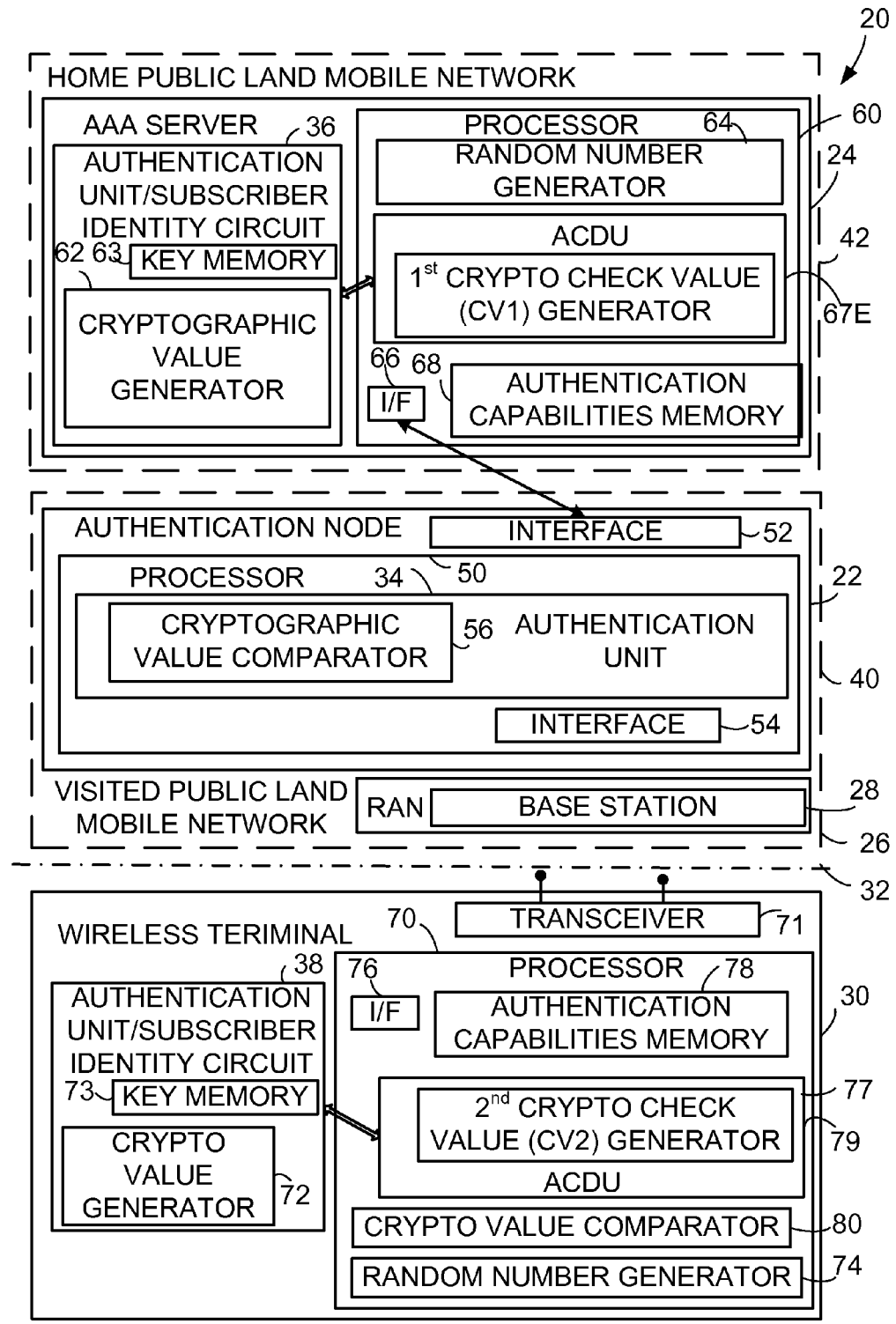

Whereas FIG. 5D illustrates a situation in which the authentication capabilities information (AC) is used by authentication node 22 to affect the output of the function F, it will be appreciated that an output-affecting employment of the authentication capabilities (AC) can also be implemented in AAA server 24. For example, FIG. 5E illustrates an example embodiment in which a function such as XRES=F'(F(K, RAND)||AC) is computed by AAA server 24 rather than authentication node 22. In the situation of FIG. 5E, the AAA server authentication unit 36 still comprises a cryptographic value generator 62E, it is the authentication capabilities dependency unit (ACDU) 67E that utilizes the authentication capabilities (AC) to perform the XRES=F'(F(K, RAND)||AC) computation, and thus the authentication capabilities dependency unit (ACDU) 67 serves as the first cryptographic check value generator for computing the first cryptographic check value (CV1).

The technology disclosed herein is particularly but not exclusively suited to the context of WiMAX or LTE authentication. In the latter case, the technology disclosed herein is particular suited when part of the UE authentication capabilities contain KDFs (Key Derivation Function) used in AAA/HSS and user equipment unit.

Other "basic" capabilities (e.g. radio/link related) that need to be exchanged before and or during authentication can be protected in a similar way as described herein.

The AAA server 24 will also choose among the capabilities of the terminal (i.e. decide which F, G, etc) functions to use. The AAA server 24 should signal its choice to the terminal in a secure way. Normally, this is handled automatically since, if an attacker tampers with the choice made by the AAA server 24, the terminal and AAA server 24 would use different algorithms to compute the authentication values, and hence get failure. But in any case, some additional protection could be achieved (e.g. if one algorithm is particularly unfavorable from security point of view) as follows: the AAA server 24 includes not only the authentication capabilities (AC), but also the actual chosen algorithm(s) in the generation of the cryptographic check values. For instance, if the AAA server 24 chooses authentication algorithm F, the FRES value is computed as FRES=F(K, RAND||"F") where "F" denotes some pre-determined way of identifying algorithm F. The value "F" is then also included in the signaling toward the terminal.

The following possible types of attacks should be considered: (1) The attacker modifies by adding a capability, c, that the terminal did not send; (2) The attacker modifies by deleting a capability, c, that the terminal sent. Type (1) is probably not very serious, as it would mean that the attacker adds a capability that the terminal does not support. Hence, the terminal will anyway be unable to compute the correct first cryptographic value (e.g., RES). Anyway, common to both types is that the authentication capabilities information (AC) value used by AAA server 24 will differ from that used by the terminal and hence they will derive non-matching authentication values.

There are several advantages of the technology disclosed herein. Among the advantages are the following:

Simple and efficient (shared-key based) protection against bidding down of authentication capabilities and other "basic" capabilities which may need to be signaled before authentication takes place.

Provision for end-to-end security between terminal and the AAA server 24.

Provision for "early" detection of tampering with capabilities (before security is switched "on").

Potential improved PKMv2 Wimax security protocol signaling.

The algorithms (corresponding to F, G, H, etc) are typically implemented in a UICC-like (Universal Integrated Circuit Card) of the terminal. In various embodiments of the technology disclosed herein only changes the inputs and/or the outputs to F, G and H. This means that UICCs are not affected and the technology disclosed herein can be provided as "software" encapsulation of the UICC.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A communications network comprising:
    a computer-implemented server configured to use authentication capabilities information of a terminal as input to a function to determine a first cryptographic value, the first cryptographic value for verifying that the authentication capabilities information of the terminal received in the network as part of an authentication procedure matches the authentication capabilities of the terminal, the authentication capabilities information providing an indication of the authentication capabilities of the terminal, wherein:
        the authentication capabilities information comprises at least one of authentication algorithms or authentication protocols supported by the terminal;
        the server is configured to choose a secondary random number and to use the secondary random number and the authentication capabilities information to determine a primary random number; and
        the server is further configured to generate the first cryptographic value as a function of the primary random number and a key, the key being pre-shared by the terminal and the server; and
    a computer-implemented authentication network node configured to make verification of the authentication procedure for the terminal using the first cryptographic value.

2. The network of claim 1, wherein the authentication network node is configured to make an explicit verification of the authentication procedure for the terminal by comparing the first cryptographic value and a second cryptographic value obtained from the terminal.

3. The network of claim 1, wherein the server is configured to determine the first cryptographic value as a function of at least the authentication capabilities information and a key, the key being pre-shared by the terminal and the server.

4. The network of claim 1,
    wherein the server is configured to use a server first function to determine the cryptographic value, and
    wherein an input to the server first function is dependent on the authentication capabilities information.

5. The network of claim 1, wherein the authentication network node comprises a SGSN, a mobile switching center (MSC), or a Mobility Management Entity (MME) of a visited public land mobile network (VPLMN).

6. The network of claim 1, wherein the server comprises a Home Subscriber Server (HSS) or an Authentication, Authorization, and Accounting (AAA) server of the home public land mobile network (HPLMN).

7. The network of claim 1,
    wherein the first cryptographic value is a cryptographic session key to be used in secured communication between the terminal and the network; and
    wherein the authentication network node is configured to make an implicit verification of the authentication procedure for the terminal upon performance of at least one of an encryption and decryption operation using the cryptographic session key.

8. A server of a home public land mobile network (HPLMN) comprising:
    electronic circuitry configured to:
        use authentication capabilities information of a terminal as input to a function to determine a first cryptographic value, the first cryptographic value for verifying that the authentication capabilities information of the terminal received as part of an authentication procedure matches the authentication capabilities of the terminal, the authentication capabilities information providing an indication of the authentication capabilities of the terminal;
        choose a secondary random number and to use the secondary random number and the authentication capabilities information to determine a primary random number; and
        generate the first cryptographic value as a function of the primary random number and a key, the key being pre-shared by the terminal and the server; and
    wherein the authentication capabilities information comprises at least one of authentication algorithms or authentication protocols supported by the terminal.

9. The sever of claim 8, wherein the server comprises a Home Subscriber Server (HSS) or an Authentication, Authorization, and Accounting (AAA) server of the home public land mobile network (HPLMN).

10. The server of claim 8, wherein the server is configured to determine the first cryptographic value as a function of at least the authentication capabilities information and a key, the key being pre-shared by the terminal and the server.

11. The server of claim 8,
    wherein the server is configured to use a server first function to determine the first cryptographic value, and
    wherein an input to the server first function is dependent on the authentication capabilities information.

12. The server of claim 8, wherein the first cryptographic value is included in an authentication token (AUTN).

13. The server of claim 8, wherein the first cryptographic value is a cryptographic session key to be used in secured communication between the terminal and the network.

14. A computer-implemented node of a communications network which is configured to:
    use authentication capabilities information of a terminal as input to a function to determine a first cryptographic value for verifying that the authentication capabilities information of the terminal received in the network as part of an authentication procedure matches the authentication capabilities of the terminal, the authentication capabilities information providing an indication of the authentication capabilities of the terminal; wherein:
        the authentication capabilities information comprises at least one of authentication algorithms or authentication protocols supported by the terminal; and the first cryptographic value is a function of a primary random number and a key, the key being pre-shared by the terminal and a server, the primary random number determined using the authentication capabilities information and a secondary random number.

15. The node of claim 14, wherein the node is configured to make an explicit verification of the authentication capabilities for the terminal by comparing the first cryptographic value and a second cryptographic value obtained from the terminal as part of verifying the authentication procedure.

16. A communications network comprising:
a first node; and
a second node;
wherein the first node is configured to receive authentication capabilities information of a terminal and to request a third cryptographic value from the second node,
wherein the authentication capabilities information comprises at least one of authentication algorithms or authentication protocols supported by the terminal;
wherein the second node is configured to generate the third cryptographic value as a function of a random number and a key, the key being pre-shared by the terminal and the second node, the random number comprising a primary random number determined using a secondary random number and the authentication capabilities information, the secondary random number chosen by the second node; and
wherein the first node is configured to use the random number, the third cryptographic value, and the authentication capabilities information as input to a function to determine a first cryptographic value, and to compare the first cryptographic value with a second cryptographic value received from the terminal and also dependent on the authentication capabilities, to authenticate the terminal and thereby also verify that the received authentication capabilities information of the terminal matches the authentication capabilities of the terminal.

17. The network of claim 16, wherein the first node comprises a visited public land mobile network (VPLMN).

18. The network of claim 16, wherein the second node comprises a home public land mobile network (HPLMN).

19. A method of operating a communications network comprising:
the network using authentication capabilities information of a terminal as an input to a function to determine a first cryptographic value, the first cryptographic value for verifying that the authentication capabilities information of the terminal received in the network as part of an authentication procedure matches the authentication capabilities of the terminal, the authentication capabilities information providing an indication of the authentication capabilities of the terminal;
a server of the network choosing a secondary random number and to use the secondary random number and the authentication capabilities information to determine a primary random number;
the server generating the first cryptographic value as a function of the primary random number and a key, the key being pre-shared by the terminal and the server;
the network making verification of an authentication procedure for the terminal using the first cryptographic value; and
wherein the authentication capabilities information comprises at least one of authentication algorithms or authentication protocols supported by the terminal.

20. The method of claim 19, further comprising a node of the network making an explicit verification of the authentication procedure for the terminal by comparing the first cryptographic value and a second cryptographic value obtained from the terminal.

21. The method of claim 19, further comprising a server of the network using a server first function to determine the first cryptographic value, and wherein an input to the server first function is dependent on the authentication capabilities information.

22. The method of claim 19,
wherein the first cryptographic value is a cryptographic session key to be used in secured communication between the terminal and the network; and
wherein the method further comprises an authentication network node of the network making an implicit verification of the authentication procedure for the terminal upon performance of at least one of an encryption and decryption operation using the cryptographic session key.

23. The method of claim 19, wherein the first cryptographic value is included in an authentication token (AUTN).

24. The method of claim 19, wherein the first cryptographic value is a cryptographic session key to be used in secured communication between the terminal and the network.

25. The method of claim 19, further comprising:
the terminal sending authentication capabilities information across a network access interface to the network, the authentication capabilities information providing an indication of authentication capabilities of the terminal;
the terminal using the authentication capabilities information to determine a second cryptographic value; and
the network using the first cryptographic value and the second cryptographic value to authenticate the terminal.

26. The method of claim 25, further comprising:
the terminal sending the authentication capabilities information across the network access interface to an authenticator network node of the network and to the server of the network;
the server using the authentication capabilities information to determine the first cryptographic value;
the terminal using the authentication capabilities information to determine the second cryptographic value; and
the authenticator network node comparing the first cryptographic value and the second cryptographic value to authenticate the terminal.

27. The method of claim 26, further comprising:
the terminal the sending authentication capabilities information across the network access interface to the authenticator network node;
the authenticator network node sending the authentication capabilities information to the server;
the server generating the first cryptographic value as a function of the authentication capabilities information, the primary random number, and a key, the key being pre-shared by the terminal and the server;
the server sending the primary random number and the first cryptographic value to the authenticator network node;
the authenticator network node sending the primary random number to the terminal;

the terminal using the primary random number, the key, and the authentication capabilities information to compute the second cryptographic value; and the terminal sending the second cryptographic value to the authenticator network node.

28. The method of claim 26, further comprising:

the terminal sending authentication capabilities information across a network access interface to the authenticator network node;

the authenticator network node sending the authentication capabilities information to the server;

the server choosing the secondary random number and using the secondary random number and the authentication capabilities information to determine the primary random number;

the server generating the first cryptographic value as a function of the primary random number and a key, the key being pre-shared by the terminal and the server;

the server sending the secondary random number and the first cryptographic value to the authenticator network node;

the authenticator network node sending the secondary random number to the terminal;

the terminal using the secondary random number and the authentication capabilities information to determine the primary random number;

the terminal using the primary random number and the key to compute the second cryptographic value; and the terminal sending the second cryptographic value to the authenticator network node.

29. The method of claim 26, wherein the server uses a server first function to determine the first cryptographic value, and wherein an input to the server first function is dependent on the authentication capabilities information.

30. The method of claim 25, further comprising:

the terminal sending the authentication capabilities information across the network access interface to an authenticator network node and to the server;

the server using the authentication capabilities information to determine the first cryptographic value;

the terminal using the authentication capabilities information to determine the second cryptographic value; and the terminal comparing the first cryptographic value and the second cryptographic value to authenticate the network.

31. The method of claim 26, wherein at least one of the cryptographic values is an authentication token (AUTN).

32. The method of claim 25, further comprising:

the terminal sending the authentication capabilities information across the network access interface to an authenticator network node and to the server;

the server using the authentication capabilities information to determine the first cryptographic value;

the terminal using the authentication capabilities information to determine the second cryptographic value; and obtaining authentication of the terminal by successfully using the first cryptographic value and the second cryptographic value for encoding and decoding communications over the network access interface between the terminal and the network.

33. The method of claim 26, wherein at least one of the cryptographic values is a master session key (MSK) key of Extensible Authentication Protocol Method for UMTS Authentication and Key Agreement (EAP-AKA).

34. The method of claim 25, further comprising:

the terminal the sending authentication capabilities information across the network access interface to an authenticator network node of the network;

the authenticator network node requesting a third cryptographic value from the server of the network;

the server generating the third cryptographic value as a function of a random number and a key, the key being pre-shared by the terminal and the server;

the server sending the random number and the third cryptographic value to the authenticator network node;

the authenticator network node using the random number, the third cryptographic value, and the authentication capabilities information to determine the first cryptographic value;

the authenticator network node sending the random number to the terminal;

the terminal using the random number, the key, and the authentication capabilities information to determine the second cryptographic value; and the terminal sending the second cryptographic value to the authenticator network node.

35. The method of claim 34, wherein the authenticator network node comprises a visited public land mobile network (VPLMN) and the server comprises a home public land mobile network (HPLMN).

* * * * *